United States Patent
Verma et al.

(10) Patent No.: US 7,254,109 B2
(45) Date of Patent: Aug. 7, 2007

(54) FAULT TOLERANT CORRELATION ENGINE METHOD AND SYSTEM FOR TELECOMMUNICATIONS NETWORKS

(75) Inventors: Subhash Verma, Fremont, CA (US); Sanjeev Chawla, Fremont, CA (US); Rakesh Chawla, Noida (IN); Gaurav Goel, Fremont, CA (US); Jaskaran S. Bawa, Haryana (IN)

(73) Assignee: BayPackets, Inc., Fremont, CA (US)

( * ) Notice: Subject to any disclaimer, the term of this patent is extended or adjusted under 35 U.S.C. 154(b) by 1043 days.

(21) Appl. No.: 10/193,818

(22) Filed: Jul. 12, 2002

(65) Prior Publication Data

US 2004/0008717 A1 Jan. 15, 2004

(51) Int. Cl.
*H04L 12/26* (2006.01)
*H04L 12/66* (2006.01)
*G06F 15/173* (2006.01)

(52) U.S. Cl. .................. 370/217; 709/224; 370/401
(58) Field of Classification Search .................. None
See application file for complete search history.

(56) References Cited

U.S. PATENT DOCUMENTS 6,052,448 A * 4/2000 Janning ............... 379/115.01
6,327,350 B1 * 12/2001 Spangler et al. ....... 379/115.01
6,363,421 B2 * 3/2002 Barker et al. ............... 709/223
6,381,306 B1 * 4/2002 Lawson et al. .......... 379/32.01
6,400,813 B1 * 6/2002 Birnhak ..................... 379/133
6,718,377 B1 * 4/2004 Bischoff et al. ............ 709/223
6,731,730 B1 * 5/2004 Zolotov ..................... 379/126
6,782,420 B1 * 8/2004 Barrett et al. .............. 709/223
6,819,751 B1 * 11/2004 Lewis et al. ............... 379/126
2002/0006791 A1 * 1/2002 Nyholm ..................... 455/423
2004/0152444 A1 * 8/2004 Lialiamou et al. ......... 455/406

* cited by examiner

*Primary Examiner*—Alpug H. Hsu
*Assistant Examiner*—Clemence Han
(74) *Attorney, Agent, or Firm*—Townsend and Townsend and Crew LLP

(57) ABSTRACT

A system for monitoring information real-time through a network. The system has a plurality of network elements Each of the network elements comprises an interface device. The plurality of network elements are configured to route a call from a source to a destination through the network elements. A mediator is coupled to each of the network elements. The mediator is adapted to receive events from any one of the network elements as the call as being routed through the elements from the source to the destination. A message bus is coupled to the mediator for receiving the events. The system also has an application process coupled to the messaging bus. The application process is adapted to use the events. The system is fault tolerant and information under process is not lost even when one of the system components fails.

8 Claims, 9 Drawing Sheets

FAULT TOLERANT CORRELATION ENGINE METHOD AND SYSTEM FOR TELECOMMUNICATIONS NETWORKS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

A portion of the present application includes a computer software program or portions of a computer software program, where all rights have been reserved under the copyright and related laws. Notice is hereby given as © 2001-2002 BayPackets, Inc., all rights reserved.

BACKGROUND OF THE INVENTION

The present invention relates generally to telecommunication techniques. More particularly, the invention provides a method, system, and computer code for monitoring and collecting information of a telephone call from a source to a destination through one or more network elements. Merely by way of example, the invention is applied to a voice over packets network such as a voice over Internet Protocol network, commonly called an IP network. But it would be recognized that the invention has a much broader range of applicability. For example, the invention can be applied to many other types of networks and combination of networks, such as circuit switched voice network, packet based voice network (e.g., VoIP, VoATM, VoDSL,), IP based video streaming network, and others.

Telecommunications have rapidly changed over the years. In the early days, Greeks and Romans relied on communications between villages by way of using fires and smoke signals. Although effective in its days, such smoke signals were often limiting in the amount of information carried. Additionally, rain, wind, and other weather factors often hampered with such signals in an undesirable manner. Other forms of communication included the use of jungle drums, which transmitted information through sound between villages in Africa. Although such drums could convey more information than smoke signals, the drums were also limiting in the amount of information transmitted. More recently, Samuel F. B. Morse invented telegraph communications in the early 1800's. Telegraph carried electrical signals through wires disposed between towns. Such electrical signals included dots and dashes, which were used to represent certain letters of the alphabet. Such dots and dashes were commonly referred to as "Morse code." Even though telegraph was fairly successful, the amount of information contained in the dots and dashes was still limiting.

Telephone soon replaced, in part, telegraph. More particularly in the late 1800s, Alexander Graham Bell invented the telephone system which carried voice signals from a source to a destination through wires. Hard wires were used to connect cities to cities, houses to houses, and the like. Telephone soon became a part of everyday life where millions of people made calls to each other to exchange information. By the 1990s, the use of computers that were connected to the telephone wires have also become widespread. Such computers communicated to each other using data packet communication over the telephone networks. One of the most famous of such networks, which connected computers around the world to each other, was called the "Internet."

Data packet communication on the Internet is dominated by traffic transported using a transport communication protocol/Internet protocol (TCP/IP) suite of protocols. The Internet protocol (IP) header of these packets contains information related to recipient and sender addresses and ports, packet size, and protocol encapsulated in the IP packet, such as transport communication protocol (CP), user datagram protocol (UDP), or Internet control message protocol (ICMP). A data packet ("packet") is a finite set of data and associated control bits of a standard maximum size, having a predefined protocol and organization.

When a user (or client) requests a web page containing embedded images, there will then be a number of TCP/IP sessions, in which information is transmitted between a web page server and the client server using TCP/IP. The number of TCP/IP sessions is equal to one more than the embedded image total, since an initial request is required to download the HyperText Markup Language (HTML) file describing the page and its contents. Each of these interactions has three stages: connection establishment, data transfer, and connection termination. A connection is established using a "three way handshake," with a request from client to server, a response from the server, and an acknowledgment of the response. During this stage, the maximum packet size is agreed on. A document request then goes to the server, and the server responds. Each packet from server to client or client to server is acknowledged, either in its own packet, or "piggybacked" in a data packet. The closing of the connection requires an exchange of FIN (for finished") commands, each one being acknowledged by the other end. A FIN command is a flag set in the packet header indicating that the sender is finished sending data.

Thus, in the first exchange, the client requests the HTML document describing the page. Upon receipt of this document, the web browser parses the document, and then initiates a series of connections for each of the embedded images (or any other type of file which may be part of the page). In typical usage, all of these exchanges occur under software control; the user has only clicked on a hypertext reference or entered a uniform resource locator (URL). As a result, these sessions will be set up and torn down faster than if they were user-initiated. Only the data packets from the server to the client that contain the document and the images are likely to be large; any packets other than data packets, e.g. control packets, will be relatively small, consisting of little more than the TCP/IP header and sometimes a small amount of control data. Further background information on TCP and IP may be found in W. R. Stevens, TCP/IP Illustrated, Vol. 1 (Addison-Wesley, 1994). Data communication has become widespread using the Internet.

Techniques used in data communication have now been implemented for voice communication. In the U.S., the telecommunication industry has undergone tremendous changes by way of introductions of the distributed Internet Protocol (IP) based switches, which were used with data communication. Industry has attempted to use such switches for communicating voice signals through the Internet. A variety of limitations, however, exist. For example, there is no easy and effective way of tracking a single call through the network, which is continuous and difficult to oversee. That is, the network is actually many networks using different protocols, which do not interface well with each other. Although effective for data communications, packet based voice communications has been difficult to implement. These and other limitations are described throughout the present specification and more particularly below.

From the above, improved telecommunication monitoring techniques are highly desirable.

BRIEF SUMMARY OF THE INVENTION

According to the present invention, techniques for telecommunications are provided. More particularly, the invention provides a method, system, and computer code for monitoring and collecting information of a telephone call from a source to a destination through one or more network elements. Merely by way of example, the invention is applied to a voice over packets network such as a voice over Internet Protocol network, commonly called an IP network. But it would be recognized that the invention has a much broader range of applicability. For example, the invention can be applied to many other types of networks and combination of networks, such as circuit switched voice network, packet based voice network (e.g., VoIP, VoATM, VoDSL), IP based video streaming network, and others.

In a specific embodiment, the invention provides a system for monitoring information real-time through a network, e.g., telephone, IP network, voice over IP network, Voice over ATM networks, and Voice over DSL networks. The system has a plurality of network elements (e.g., router, switch, softwswith, Gateways, Integrated Access Devices), where each of the network elements is coupled together in a network. Each of the network elements comprises an interface device. The plurality of network elements are configured to route a call from a source to a destination through the network elements. A mediator is coupled to each of the network elements. The mediator is adapted to receive events from any one of the network elements as the call is being routed through the elements from the source to the destination. A message bus is coupled to the mediator for receiving the correlated events and Call Detail Records. The system also has an application process coupled to the messaging bus. The application process is adapted to use the correlated events. As merely an example, the application process includes Billing System, Fraud detection and control systems, and Churn Management Systems, as well as other legacy systems.

In an alternative specific embodiment, the invention provides a fault tolerant system for monitoring information real-time through a network. The system has a plurality of network elements, where each of the network elements is coupled together in a network. Each of the network elements comprises an interface device. The plurality of network elements are configured to route a call from a source to a destination through the network elements. A plurality of mediator processes are coupled to each of the network elements. The plurality of mediator processes can be numbered from 1 to N, where N is an integer greater than 1. Each of the mediator processes is adapted to receive events from any one of the network elements, through the distributor process, as associated with the call as the call is being routed through the elements from the source to the destination. A distributor process is coupled to each of the mediator processes. The distributor process receives incoming events and distributes these events to mediator processes. Distribution process ensures that the events belonging to a call are sent to one mediator process. In case of failure of any mediator process distributor process is adapted to distribute incoming events for any one of the mediator processes that experiences a fault to the other 1 through N mediator processes excluding the mediator process(es) that has experienced a fault.

In yet an alternative embodiment, the invention provides a real time call monitoring system for fraud detection through a network. The system has a plurality of network elements, where each of the network elements is coupled together in a network. Each of the network elements comprises an interface device. The plurality of network elements are configured to route a call from an source to a destination through the network elements. A fraud detection mediator is coupled to each of the network elements. The fraud detection mediator is adapted to receive events from any one of the network elements as the call is being routed through the elements from the source to the destination. The fraud detection mediator is able to identify a pre-selected call based upon one or more rules provided in the fraud detection mediator. The rules are often coupled to a filter process, which handles the events based upon the rules. An output device is also coupled to the fraud detection mediator. The output device is adapted to provide an output signal based upon the pre-selected call.

In a further alternative embodiment, the invention provides a method for monitoring a telephone call through packet-based networks and the like. The method includes initiating a call at a source, which is coupled to one or more networks adapted for packetized communication. The method transfers first call information of the call from the source to a destination through a plurality of network elements, where the plurality of network elements are numbered from 1 to N, where N is an integer. The method outputs events numbered from 1 through M associated with the first call information as the call information traverses through the network elements numbered from 1 through N, where the network elements numbered from 1 through N correspond to the events numbered from 1 through N. The method includes receiving the events numbered from 1 through N at a network interface, which is coupled to the one or more networks. The method then converts the events numbered from 1 through N to a common protocol and distributes the events associated with the first call information to one of a plurality of a mediators. A step of transferring second call information associated with the events associated with the first call information to a bus is included.

Numerous benefits are achieved using the present invention over conventional techniques. In a specific embodiment, the invention provides a system and method that is scalable, fault tolerant, and hot plug-able. System can be upgraded to receive events from different network elements using different protocols by just plugging-in protocol module for that protocol and network element. Preferably, the system can adapted to plug in any module for new and improved protocols. Additionally, such system and method can be used to support more than eight (8) million calls and is preferably platform independent as well. Preferably, the system and method can be used to collect events (e.g., usage activity) over a variety of network elements, such as those noted above as well as others. The present system can be implemented using conventional software and/or hardware. In other embodiments, the system can support future network configurations and the like or any combination of networks. Other benefits are provided throughout the present specification and more particularly below.

In a specific embodiment, the events are collected at a high speed to support collection and processing of at least 8×15 Million Information Elements ("IEs") per hour, but can be smaller depending upon the embodiment. These information elements are generally stored in multiple levels of persistence storage ranging from duplicated main memory to disk based storage using a method according to the present invention. The processed events are fed to different Operation and Support Systems (OSS) after doing necessary correlation/filtering and formatting as per the OSS requirements. In most embodiments, call detail records, commonly called "CDRs," are generated out of the event correlation. Different kinds of information can be generated by the same set of IEs. In preferred embodiments, the invention has a system and method that is capable of being adapted to existing legacy OSSs, e.g., billing, fraud detection, provisioning and maintenance systems. Such OSSs may use voice over packet networks or the like. In other aspects, the invention provides for real time billing and real time fraud management using a Finite State Machine ("FSM") for each and every call within a network so that it is possible to provide any operation on the collected information at any instant of the call. Since Finite State Machine is maintained for each call, system has the detailed knowledge of the call progress information. It is also possible to generate intermediate information about the call when it is a long duration call. Depending upon the embodiment, one or more or none of these benefits may exist. These and other benefits are described throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for telecommunications are provided. More particularly, the invention provides a method, system, and computer code for monitoring a telephone call from a source to a destination through one or more network elements. Merely by way of example, the invention is applied to a voice over packets network such as a voice over Internet Protocol network, commonly called an IP network. But it would be recognized that the invention has a much broader range of applicability. For example, the invention can be applied to many other types of networks and combination of networks, such as circuit switched voice network, packet based voice network (e.g., VoIP, VoATM, VoDSL), IP based video streaming network, and others.

Figure 1:
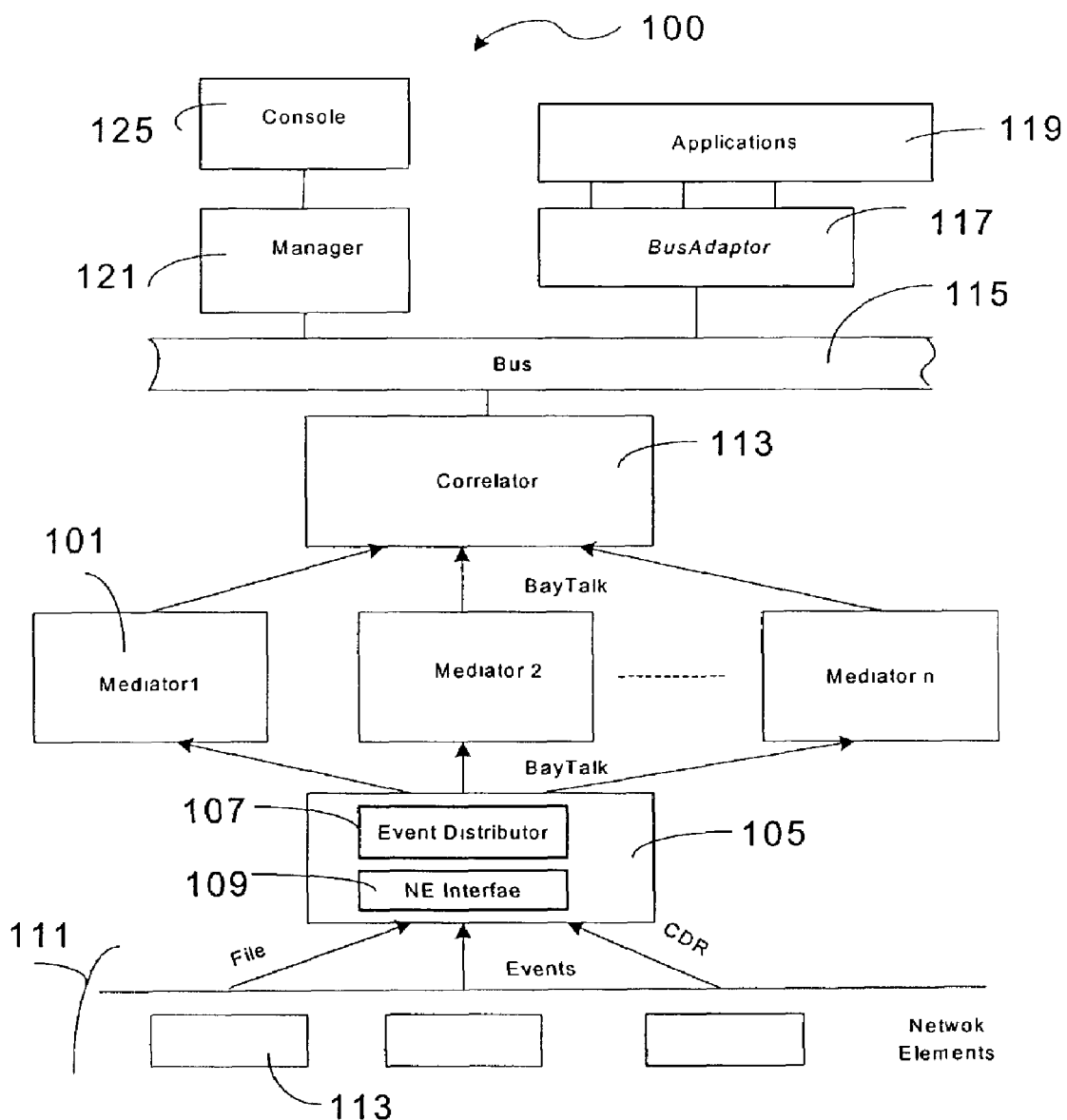
FIG. 1 is a simplified diagram of a telecommunication system according to an embodiment of the present invention.

FIG. 1 is a simplified diagram of a system 100 according to an embodiment of the present invention. This diagram is merely an example and should not unduly limit the scope of the claims herein. One of ordinary skill in the art would recognize many other variations, modifications, and alternatives. As shown, the system 100 has a variety of elements and/or sub-systems. Such elements include a plurality of mediator systems 101 numbered from 1 to N, where N is an integer. Each of the mediator systems monitors network activity or events through an adaptor 105, which includes a distributor 107 and an interface 109, through a common interface. The adaptor receives events, which may be in different formats, from the network and converts them into a common protocol, which is used to direct events associated with a specific call to one of the mediator systems. Here, the mediator system tracks a call over the network or networks from a source to a destination through all of the network elements, which the call goes through, as will be explained in more detail below. The adaptor 105 couples to a network 111, such as a wide area communication network, having network elements 113. Each of the network elements is the one commonly found in a typical telecommunication network. Such elements include, among others, Routers, Switches,Application Servers, Softswitches, Media gateways, and, Integrated Access Devices. A correlator system couples the mediators to a bus 115. The bus couples to one or more application programs 119 through bus adaptor 117. A console 125 coupled to a manager 121 interfaces through the bus 115 to the correlator and mediator systems.

In a specific embodiment, different network elements in a telecommunication network generate activity information in the form of events, as shown. Such events are collected through an intermediate platform at the adapter 105. The adaptor is a performance module, which is capable of receiving and distributing events at the rate of 8×15 million events per second or greater. The adaptor 105 interfaces with the network elements and distributes the events to one or more mediator for supporting higher traffic. This makes the system scalable. More mediators can be added to the system dynamically in order to handle more traffic. In the event of the failure of one mediator, adaptor distributes the load of the failed monitor among the active mediators. Adaptor is capable of collecting events from different network elements in different formats including batch transfer through files, CDRs and raw events. The adaptor distributes the load to the mediators evenly to avoid any over engineering and saves costs in a preferred embodiment.

Each of the mediator systems processes the events and converts them into proprietary information elements or other common format. The information elements are generic and are independent of the network and network elements in a preferred embodiment. The information elements are correlated with the information elements of other events and converted to Call Detail Record (CDR) at the correlator, which can be sent through the bus to a variety of systems for use. The conversion process is rules based for easy customization and adaptation as the OSS requirements. The mediator also has the capability of filtering the events based on the rules for supporting Fraud Control and _The Commission On Accreditation For Law Enforcement Agencies, ("CALEA") applications. As noted, the system also interfaces to legacy OSS 119 by providing suitable adaptors 117.

As shown, the system has two or more mediator systems associated with adaptor and correlator. The mediator systems receive distributed events based on load to each of the mediator systems. Event distribution is done intelligently as all the events related to a call are to be passed to only one mediator in a preferred embodiment. Here, the mediator starts a Finite State Machine for each call when the first event of that call is received. The events are collected and processed by the mediator up to a logical point and stored in a persistent database. Once the events are stored in the database, an acknowledgment is sent to the adaptor so that the adaptor can delete the event from its memory. The event is deleted from the memory of both the adaptors, when two are used for back up purposes. The adaptor maintains information about the events (calls) currently being handled by a particular mediator.

Preferably, the present system provides a fault tolerant process and system. More preferably, the present system is carrier grade where information is not lost even if a component fails. In a specific embodiment, the system has two or more adaptors, including a primary and secondary. Heart beat signal runs between the primary and secondary adaptor through a proprietary protocol. There are two links between the adaptors and heartbeat runs on both the links. If one link fails the second link takes over. The protocol has built-in facility for link failure detection and switching of the links from primary to secondary without applications knowing about it. That is, transfer of functionality between the adaptors occurs in a transparent manner to the applications. When the adaptor receives an event it sends a copy of the event to other adaptors before sending acknowledgment to network element. This replication continues on event-by-event basis. If one of the adaptors fails there is no loss of information as the data is available in the other adaptor.

As noted, preferably, the system and two or more mediator systems coupled to each other. If a mediator fails, the adaptor redistributes the information about the events, which were being processed by failing mediator to other active mediators. So other mediators retrieve the events from the database and reprocess them. Preferably, the system also has two or more correlators including a primary and secondary. The correlator keeps records of the Usage Records (information generated by the mediator after processing the events) and replicates this information to the other correlators. The correlator generates the CDRs after processing of the Usage records and saves on the persistent database. If a correlator fails other correlator takes over and retrieves the information from the database and continues processing. Heartbeat runs between the correlators through the protocol. Additional details of the present system can be found throughout the present specification and more particularly below.

Although the above has been described in terms of specific system hardware and software features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Figure 2:
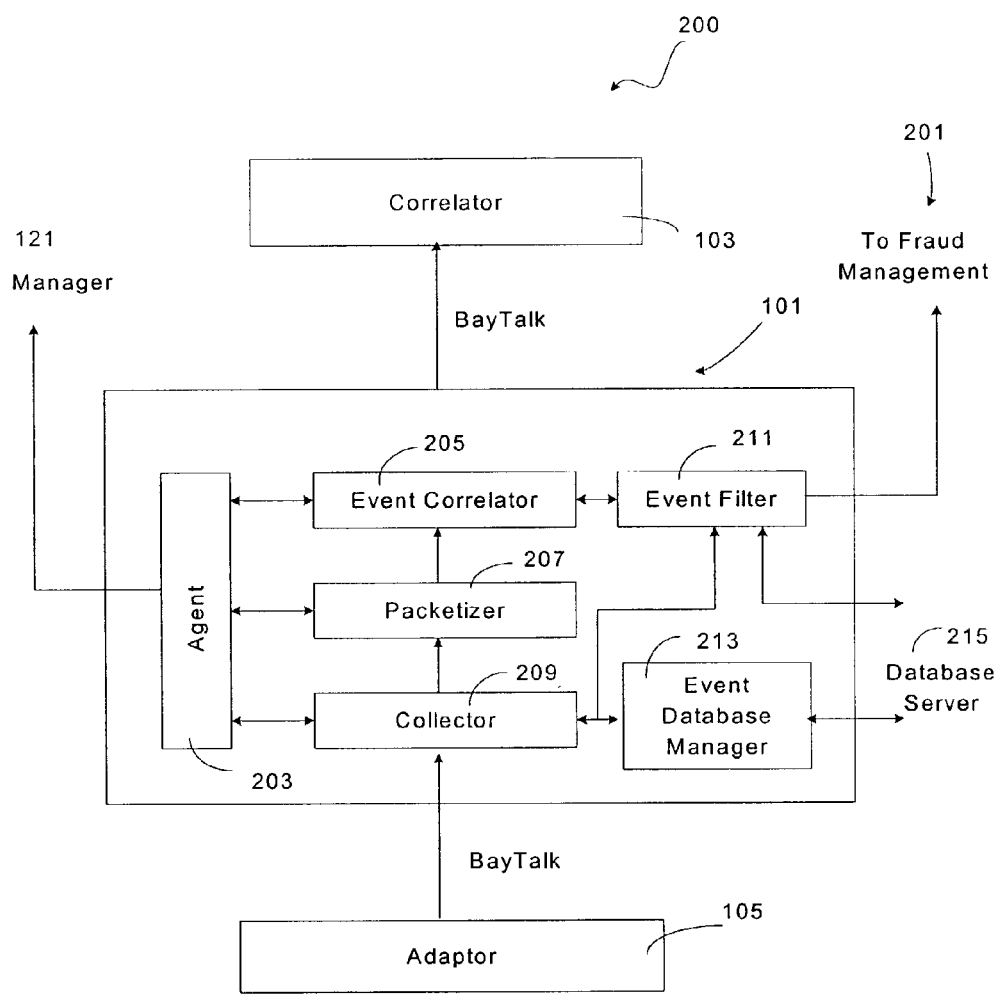
FIG. 2 is a simplified diagram of a mediator module according to an embodiment of the present invention.

FIG. 2 is a simplified diagram 200 of a mediator module 101 and other elements according to an embodiment of the present invention. This diagram is merely an example and should not unduly limit the scope of the claims herein. One of ordinary skill in the art would recognize many other variations, modifications, and alternatives. Like reference numerals are used herein as some of the other figures for easy cross-referencing, but are not intended to be limiting in any manner. As shown, the diagram 200 has mediator 101, adaptor 105, and correlator 103. Certain elements of the mediator are also shown. Such elements include an agent, 203, which is coupled to elements including an event correlator 205, packetizer 207, collector 209. The correlator is coupled to event filter 211, which is coupled to event database manager 213. The filter 211 and manager 213 couple to database server 215. As noted, the mediator collects protocol specific events from the adaptor. After performing a first level correlation, it translates such events into generic events called Usage Records (URs).

The following sub-sections describe the functionality of each of the functional blocks including the correlator, packetizer, collector, filter, and event manager, and others. The events generated by the packetizer and correlated by the correlator may be sent out (after filtering) using the event filter. The events may then be used by applications like Fraud Management 201 and CALEA after appropriate translations. Such Fraud Management application has been described throughout the specification and will be described more fully below.

In a specific embodiment, the mediator system includes collector 209, which receives the events in the common protocol. Preferably, the collector accepts protocol specific events from the adaptor through proprietary protocol. Preferably, the collector provides rule based filtering, which has been preselected. As merely an example, one use of this feature could be to drop duplicate and unwanted events based upon the preselected rules and/or filters. The collector also provides correlation using user defined correlation rules. An example of such rules are provided below:

1. Maintains call/session/transaction state machine for error detection and control;
2. Maintains call/session/transaction state machine for missing events, out of sequence events, duplicate events, malformed events, wrongly addressed events, etc.

The collector interfaces with Event Database Manager 213, which stores events, and provides an indication when the call/session/transaction gets over. The collector is associated Event Database Manager for storage of event information in the database. In a specific embodiment, the Event Database Manager interfaces with any one of a variety of databases, which are independent of location. The database location is a configurable parameter thereby providing the facility to have database on another machine for sake of efficiency, reliability, etc. The collector also generates timer events (if not provided by the NE protocol) to provide call in progress indicators, which are provided to other applications. The event structure, state machine and handling of self-generated progress indicators are user configurable via rules. Also, the collector interfaces to the adaptor using the protocol to provide congestion (and relief) notifications. The adaptor uses these notifications to do a more intelligent load balancing and may also take other actions. Other functionality of the collector may be found throughout the present specification and more particularly below.

The Event Database Manager couples to the collector and database storages (which are not shown). Here, the Manager provides interfaces for storage of events derived from the network. For efficiency purposes, the event(s) associated with a call/session/transaction are stored in 'in-memory' database until it is not terminated. The in-memory database is synched with a secondary storage based database on a regular bases. After the call terminates, the events are removed from the in-memory database, they are however available in the secondary storage based database according to a specific embodiment.

The Manager also provides for a database backup. That is, the manager may backup the events based upon a trigger, which is user defined, scheduled, or based upon some other set or sets of parameters. The schedule may be repetitive or non-repetitive or both repetitive and non-repetitive. As merely an example, the backup could occur at 2:00 am every Saturday in a repetitive manner.

In a specific embodiment, the Manager also provides for database aging (user specified period) in a circular manner. For example if aging is set to 8 days, then on the 8th day the first days events are overridden. As multiple events are created for a call and they could span two days (boundary case), in this case the first event for a call shall decide where the other events of the call are going to get stored. Of course, other functionality could be performed or monitored using the Manager.

The mediator also has a packetizer 207 coupled between the event correlator and collector. The packetizer receives protocol specific events from the collector and converts them to normalized events called normalized events. Each normalized event is an aggregation of information elements, which include sufficient information for application co-relation and CDR/IPDR generation. The packetizer also maps protocol specific events to normalized events and their information content into information elements is configurable through rules for extensibility purposes.

An event correlator 205 is also included. As shown, the event correlator receives normalized events from the packetizer and converts them into usage records. In a specific embodiment, the usage records may be stored in a database. The usage records are sent from the correlator to an application correlator through the common protocol. Of course, other functionality may also be included in the correlator.

The event filter 211 is coupled between the event correlator and outside applications, such as the Fraud Management application. In a specific embodiment, the event filter provides the interface using a bus for external applications for receiving the normalized events, which have been collected and may have been correlated. The filter provides for user configurable filtering support based on event contents and may include other factors. The filters can be specified on a per destination basis with the ability for wildcard support etc. The filter also provides an ability to reduce the information content (again specified on a per destination basis) of the event, which is to be sent out. Further details of the mediator module are provided according to the figure below.

Figure 2A:
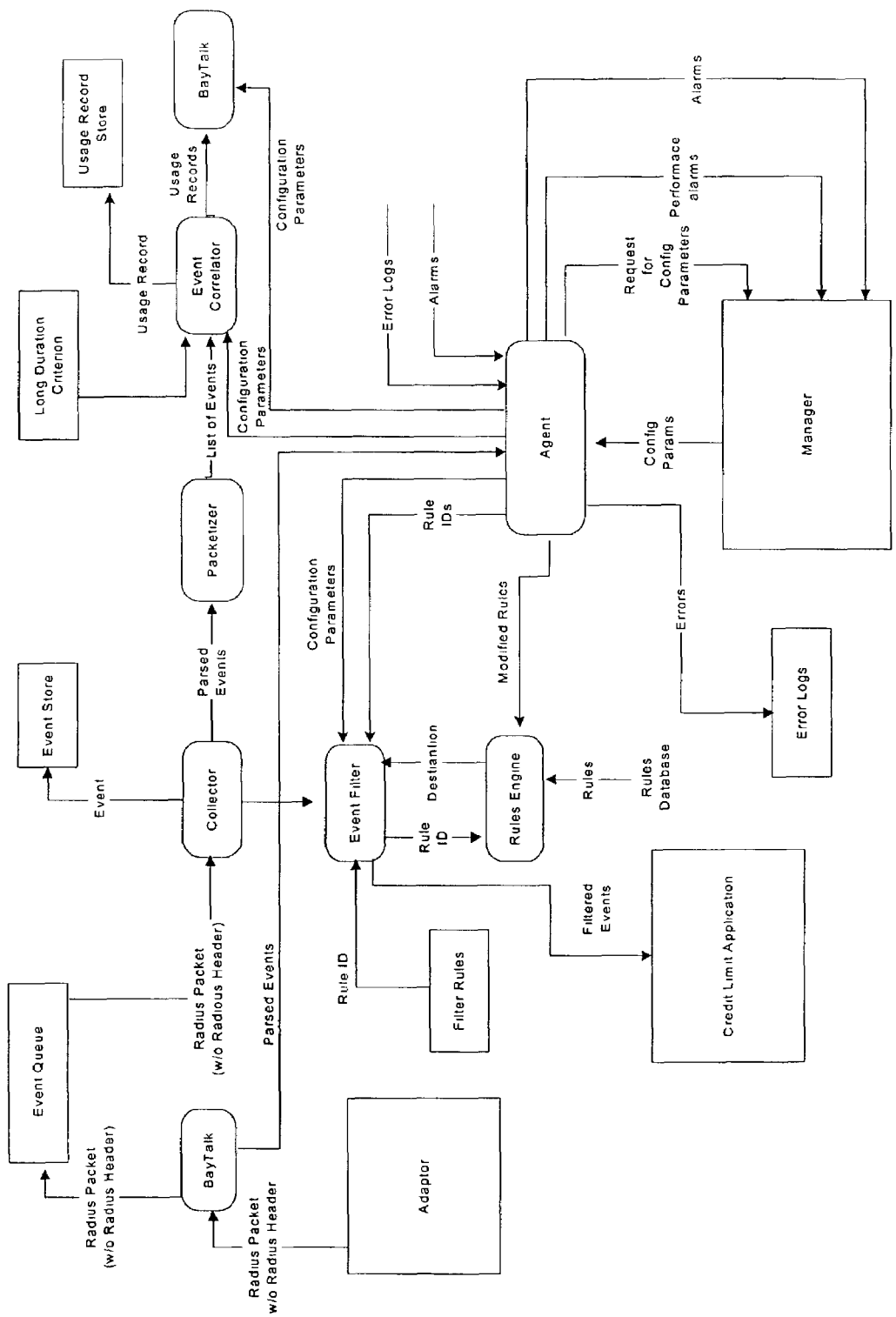
FIG. 2A is a more detailed diagram of the mediator module according to an embodiment of the present invention.

FIG. 2A is a more detailed diagram of the mediator module flow according to an embodiment of the present invention. This diagram is merely an example and should not unduly limit the scope of the claims herein. One of ordinary skill in the art would recognize many other variations, modifications, and alternatives. Like reference numerals are used herein as some of the other figures for easy cross-referencing, but are not intended to be limiting in any manner. As shown the diagram includes the specific elements described above, and also illustrates the flow of information through the mediator module. FIG. 2A describes internals of the mediator module and explains how different subcomponents of the Mediator interact with each other. Mediator receives incoming events from Adaptor. These events are placed in an event queue. Events are taken out of the queue one by one and passed to collector. Collector receives and parses the events proper parsing. These parsed and normalized events are sent to packetizer, which normalizes the events. Event correlator receives parsed and normalized events and does correlation based on rules. Event filter filters the events based on the filtering rules and generate Usage Records. These Usage Records are independent of event type and network technology. Usage Records are passed to the correlator for generation of CDRs. Rules are stored in rules database and executed by rules engine. Management and configuration of Mediator subcomponents is done through agent. Agent communicates with the Manager and does configuration and control of Mediator based on commands received from the manager. As merely an example, sample for the raw events and corresponding UR has been described more fully below.

Although the above has been described in terms of specific system hardware and software features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Figure 3:
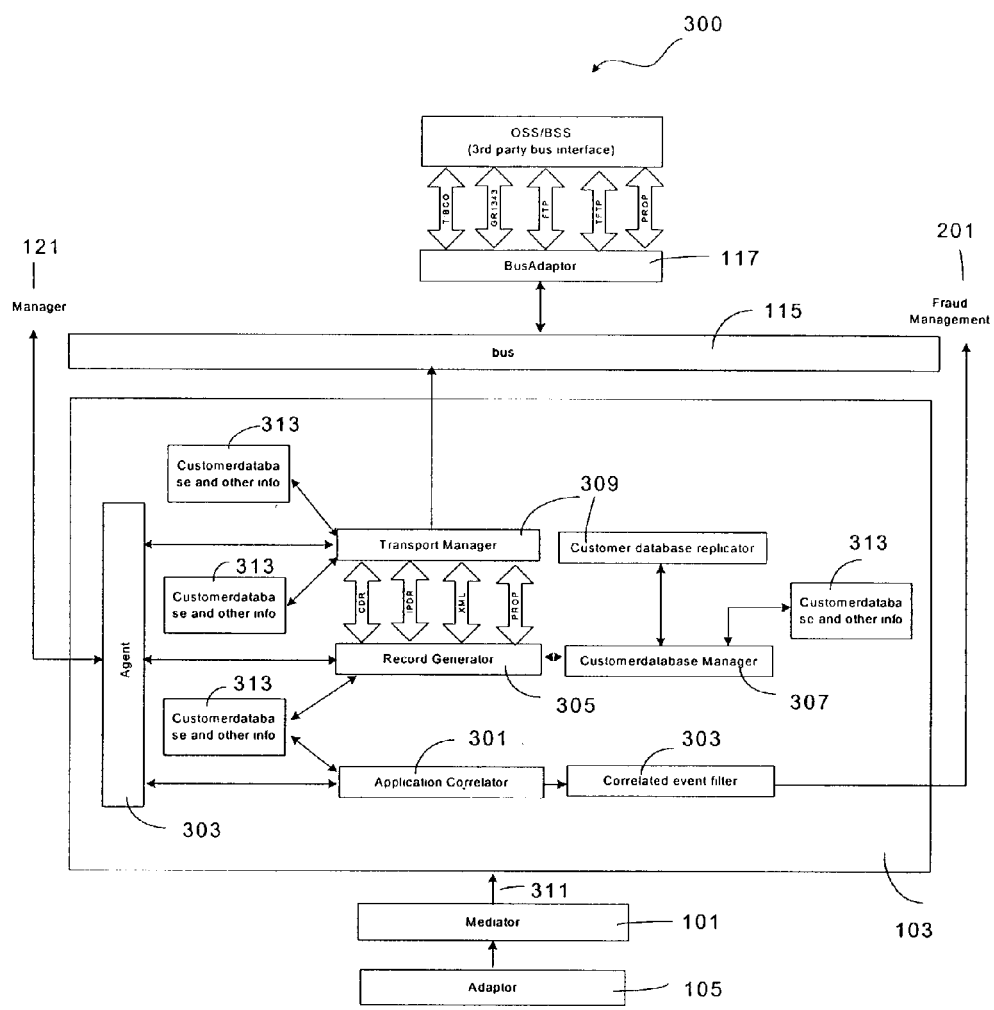
FIG. 3 is a simplified diagram of a correlator module according to an embodiment of the present invention.

FIG. 3 is a simplified diagram 300 of a correlator module 103 according to an embodiment of the present invention. This diagram is merely an example and should not unduly limit the scope of the claims herein. One of ordinary skill in the art would recognize many other variations, modifications, and alternatives. Like reference numerals are used in this figure as the others, but are not intended to be limiting. As shown, the diagram includes correlator module 103, which is coupled between the mediator 101 and the bus 117, which interfaces to applications, including legacy systems. The adaptor 105 coupled to the mediator is also shown. In a specific embodiment, the correlator receives URs from various mediators over the designated protocol and correlates them to generate various types of CDRs. Here, the CDRs are provided to the bus or other elements of the system, which are shown or not shown.

The correlator has various elements including application correlator 301, correlated event filter 303, record generator 305, customer database manager 307, customer database replicator and transport manager 309, and there may be other elements. A common protocol 311 is used to transport URs between the mediator and the correlator. The application correlator 301 identifies (after applying rules based correlation) if a higher level correlation is required and performs processing for such higher level correlation. Such processing includes sending partially correlated URs, which requires higher level correlation, to another correlator for further processing. An agent 303 couples the correlation elements to the manager 121. Many of the elements receive information from customer databases and other information sources 313. The correlated event filter couples to the fraud manager. Details of each of the elements are provided more fully below:

(A) Application Correlator
 (i) Correlates URs for a particular call traversing through multiple networks.
 (ii) Generates URs for the delivery to OSS/BSS. OSS/BSS can use UR information for getting more granular details of the call and fraud detection. Multiple destinations and formats can be specified using user definable rules. In order to provide hierarchical processing, the correlated event/Usage Record can be sent to another (higher level) correlator. Such processing is performed using one or more preselected rules.
 (iii) Usage Records are formed using generic, reusable information elements.
 (iv) Interfaces with RecordGenerator to send usage record(s) in application specific format (e.g. CDR, IPDR) to target application(s).
(B) Record Generator
 (i) Interfaces with Application Correlator and receives Usage Records.
 (ii) Determines (from rules) the format (CDR, IPDR etc.) of records to be generated and their destination applications.
 (iii) Interfaces with the required format generator plug-ins e.g. CDR, IPDR to generate the record and passes it on to the Transport Mgr. for sending it to the destination application.
(C) Transport Mgr.
 (i) Stores CDRs etc. received.
 (ii) Determines the address of the destination application.
 (iii) Provides the feature of batch transportation of records on a per destination basis (rule based). The period after which the batch records are to be sent is also rule based.
(D) Correlated Event Filter
 (i) Receives correlated events from Application Correlator and transmits them onto the bus (after rule based filtering). These events could then be used by applications like Fraud Management, CALEA etc.
(E) Customer Database Replicator
 (i) Replicates the customer database by interfacing with an OSS. Customer database is required by the Record Generator to enhance the usage information.
 (ii) Converts the customer database format retrieved into an internal format and interfaces with the Customer Dbase Mgr. to store this.
(F) Customer Dbase Mgr.
 (i) Provides interface to update and access the customer database.

Figure 3A:
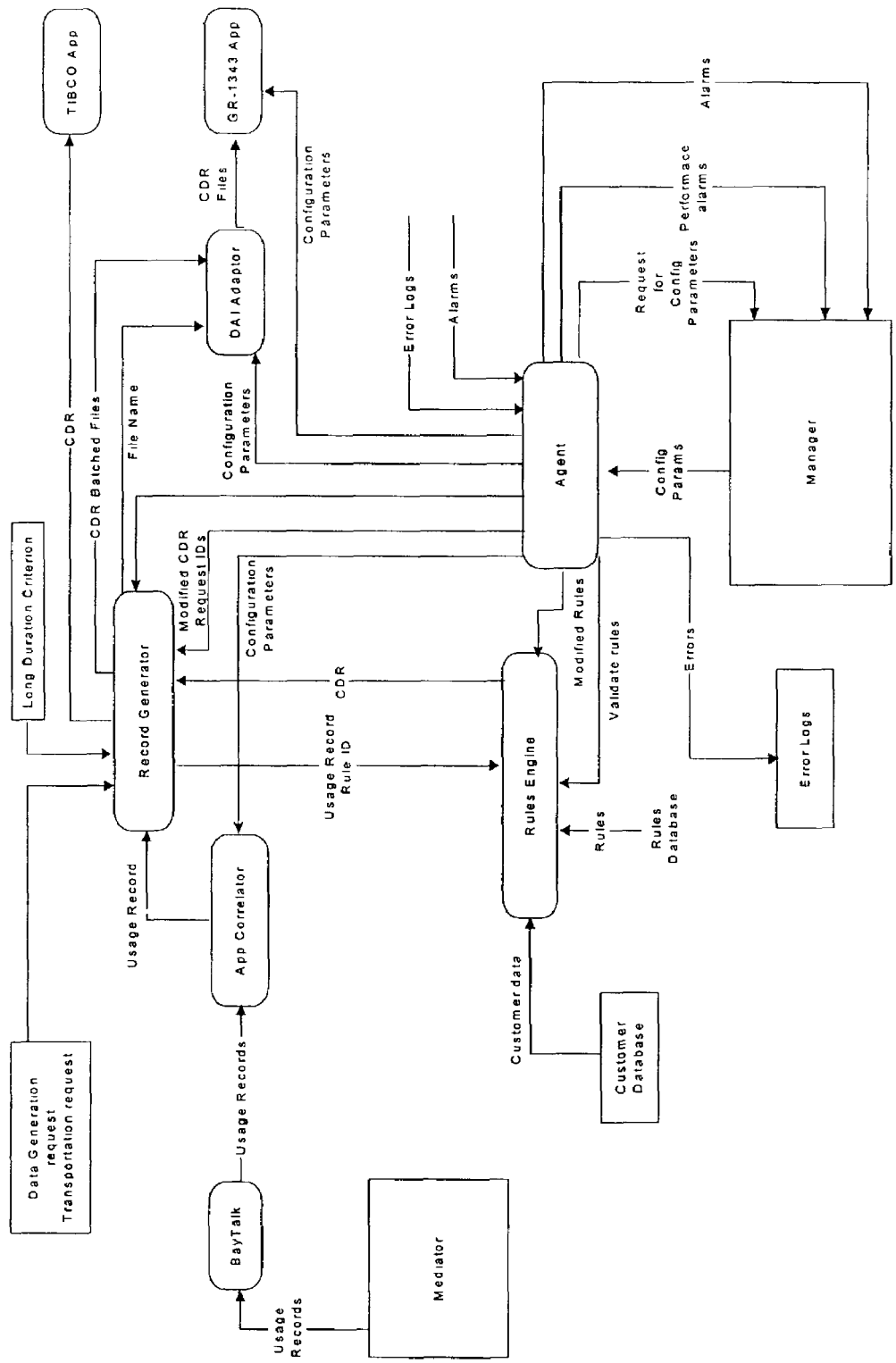
FIG. 3A is a more detailed diagram of the correlator module according to an embodiment of the present invention.

FIG. 3A is a more detailed diagram of the correlator module according to an embodiment of the present invention. This diagram is merely an example and should not unduly limit the scope of the claims herein. One of ordinary skill in the art would recognize many other variations, modifications, and alternatives. FIG. 3A describes internals of the correlator module and explains how different subcomponents of the correlator interact with each other. Correlator receives Usage Records from the Mediator and correlates them to generate CDRs. AppCorrelator performs the rule based higher level correlation of the received usage records. AppCorrelator also does rules based correlation. Correlated usage record is send to the Record Generator where it is converted to CDRs in different formats. The format of the CDR can also be defined through rules. Generated CDRs are sent to different applications through different adaptors based on the receiving application requirements. Example of such interface is DAI adaptor for supporting GR-1343 interface. Rule are stored in rules database and executed by rules engine. Management and configuration of Correlator subcomponents is done through agent. Agent communicates with the Manager and does configuration and control of Correlator based on command received from the manager. In a specific embodiment, the invention provides an example of generating CDR from a UR is given below. The example has been given in script language.

```
1
one
onedesc
--
**************************************************************
********* ---
-- *** This script contains the BAF call type 001 (structure code 0020) *** ---
-- CDR generation code. Call type 001 has 63 bytes, LNP module has *** ---
-- *** 27 bytes, and LD module has 9 bytes. The final module has 2 *** ---
-- *** bytes.
*** ---
--
**************************************************************
********* ---
--To Get Originating NPA Originating Number
--First 3 charaters are extracted from the originating number
--converted to BCD to get Originating NPA. Next 7 Characters
--are extracted and converted to BCD to get Origination Number
var text origNpa;
var text tempCPNum;
var text origNxx;
var number numOrigNpa;
var number numOrigNxx;
var number cldPrtOffHk;
var datetime startTime;
tempCPNum =    Trim (BPUR.CallingPtyNum);
origNpa =      SubStr(tempCPNum, 0, 3);
origNxx =      SubStr(tempCPNum, 3, 7);
numOrigNpa =   ToInt(origNpa);
numOrigNxx =   ToInt(origNxx);
--This is to calculate the Overseas Indicator Refer Table 15 (GR 1100)
--IntCallInd will have 0 for non-International calls. For International
--calls it will have codes as in Table 15, Destination number is being
--used to get the Overseas Indicator.
var number     IntCallInd;
var text       destNum;
var text       destNpa;
var text       destNxx;
var text       overSeasPrefix;
var number     numDestNpa;
var number     numDestNxx;
destNum =      Trim(BPUR.RoutingNum);
overSeasPrefix = SubStr(destNum, 0, 3);
-- If the destination number starts with the international access code, then
-- remove the access code before using the destination number further.
if (overSeasPrefix == "011")
BEGIN
-- The international call indicator field depends on the number of digits in
-- the called party number (excluding the access code).
    IntCallInd = (Length (destNum) - 3) - 4;
    var number newDestNumLen = Length(destNum) - 3;
    destNum = SubStr(destNum, 3, newDestNumLen);
    var number destNxxStartingIndex = newDestNumLen - 7;
    var number destNpaLength = newDestNumLen - 7;
    destNxx = SubStr(destNum, destNxxStartingIndex, 7);
    destNpa =SubStr(destNum, 0, destNpaLength);
END
else
BEGIN
    IntCallInd = 1;
    tempCPNum =   Trim (BPUR.RoutingNum);
    destNpa =     SubStr(tempCPNum, 0, 3);
```

-continued

```
        destNxx =           SubStr(tempCPNum, 3, 7);
        numDestNpa =        ToInt(destNpa);
        numDestNxx =        ToInt(destNxx);
END
cldPrtOffHk = 0x0;
startTime = BPUR.TxnStartTime;
-- Determine the Service feature used
var number featureCode = 0;
var number srvType = BPUR.ServType;
if (srvType == 2)
BEGIN
        featureCode = 012;
END
else
BEGIN
        if (srvType == 106)
        BEGIN
                featureCode = 014;
        END
        else
        BEGIN
                if (srvType == 107)
                BEGIN
                        featureCode = 014;
                END
                else
                BEGIN
                        if(srvType == 1)
                        BEGIN
                                featureCode = 000;
                                cldPrtOffHk = 0x5;
                                startTime = BPUR.srvStartTime;
                                var text          termFromCldPtyNum;
                                var text          termActNpa;
                                var text          termActNxx;
                                var number        cldPtyLen;
                                termFromCldPtyNum = Trim (BPUR.CalledPtyNum);
                                cldPtyLen = Length (termFromCldPtyNum);
                                if(cldPtyLen < 7)
                                BEGIN
                                        numDestNpa = 0;
                                        numDestNxx = ToInt (termFromCldPtyNum);
                                END
                                else
                                BEGIN
                                        termActNpa = SubStr (termFromCldPtyNum, 0,
cldPtyLen - 7);
                                        termActNxx = SubStr (termFromCldPtyNum, cldPtyLen -
7, 7);
                                        numDestNpa = ToInt (termActNpa);
                                        numDestNxx = ToInt (termActNxx);
                                END
                        END
                END
        END
END
-- Calculates the sub-fields for timing Indicator Refer Table 8
var number LongDurParty;
if (BPUR.RecType == 2)
-- This is a partial record
BEGIN
        if (BPUR.RecStartTime == BPUR.TxnStartTime)
-- This is the first partial record
        BEGIN
                LongDurParty = 1;
        END
        else
-- This is a subsequent partial record
        BEGIN
                LongDurParty = 2;
        END
END
else
-- This is a complete record
BEGIN
        LongDurParty = 0;
END
var number RecordLength = 63;
var number structCodeModIndicator = 0;
-- Identifying Continuation Record. This logic is required to
figure out
-- whether or not a long duration module should be appended to
the CDR. This
-- indirectly also influences the length field (record descr
word) value and
-- the length of the record.
var number LongDurModReqd = 0;
if(BPUR.RecType == 2)
BEGIN
        if(BPUR.RecStartTime != BPUR.TxnStartTime)
        BEGIN
                LongDurModReqd = 1;
                RecordLength = RecordLength + 9;
                structCodeModIndicator = 4;
        END
END
-- Identifying the database query type. If the query type is
LNP, then we need
-- to append an LNP module to the CDR.
var number LNPReqd = 0;
if (BPUR.QryType == 2)
BEGIN
        LNPReqd = 1;
        RecordLength = RecordLength + 27;
        structCodeModIndicator = 4;
END
-- If any module is appended to the CDR, then we also need to
append the end
-- module to it. This is called Final Module in BAF.
RecordLength = RecordLength + 2;
-- Collect all the arguments required for DB lookups.
var text preamble;
var text bpurOrigElemTypeChar = IntToChar (BPUR.OrigElmtType);
var text sensorTypeDbLookupVal = DBLookup ("ELEMENT_TYPE",
                                            "ELEM_TYPE",
                                            "SENSOR_TYPE",
                                            bpurOrigElemTypeChar);
preamble = "Sensor Type" + sensorTypeDbLookupVal;
Print (preamble);
var text sensorIDDbLookupVal = DBLookup("NET_ELEMENT",
                                         "ELEM_ID",
                                         "SENSOR_ID",
                                         BPUR.OrigElmtId);
preamble = "Sensor ID" + sensorIDDbLookupVal;
Print (preamble);
var text spidChar = IntToChar(RecGen.spid);
var text recOffTypeDbLookupVal = DBLookup
                                         ("SERVICE_PROVIDER",
                                         "SVP_ID",
                                         "REC_OFF_TYPE",
                                         spidChar);
preamble = "Recording OfficeType" + recOffTypeDbLookupVal;
Print (preamble);
var text recOffIdDbLookupVal = DBLookup ("SERVICE_PROVIDER",
                                         "SVP_ID",
                                         "REC_OFF_ID",
                                         spidChar);
preamble = "Recording OfficeID" + recOffIdDbLookupVal;
Print (preamble);
-- Qos Hold Time = QosCommitTS - QosReserveTS
-- Qos Active Time = QosReleaseTS - QosCommitTS
var datetime origQosHoldTime;
var datetime origQosActiveTime;
var datetime termQosHoldTime;
var datetime termQosActiveTime;
var number origPresent = 0;
var number termPresent = 0;
if (PRESENCE (BPUR.OrigQosCommitTS))
BEGIN
        if (PRESENCE (BRUR.OrigQosReserveTS))
        BEGIN
                origQosHoldTime = BPUR.OrigQosCommitTS -
BPUR.OrigQosReserveTS;
                origPresent = 1;
        END
        if (PRESENCE (BPUR.OrigQosReleaseTS))
        BEGIN
                origQosActiveTime = BPUR.OrigQosReleaseTS -
```

```
BPUR.OrigQosCommitTS;
        origPresent = 1;
    END
END
if (PRESENCE (BPUR.TermQosCommitTS))
BEGIN
    if (PRESENCE (BPUR.TermQosReserveTS))
    BEGIN
        termQosHoldTime = BPUR.TermQosCommitTS -
BPUR.Term QosReserveTS;
        termPresent = 1;
    END
    if (PRESENCE (BPUR.TermQosReleaseTS))
    BEGIN
        termQosActiveTime = BPUR.TermQosReleaseTS -
BPUR.TermQosCommitTS;
        termPresent = 1;
    END
END
if (origPresent == 1)
BEGIN
    RecordLength = RecordLength + 12;
END
if (termPresent == 1)
BEGIN
    RecordLength = RecordLength + 12;
END
-- Qos Duration Determination Ends
-- Follwing is needed to add a proprietary module to BAF CDR
containing
-- Orig Element Id in ASCII format. It has 2 header bytes and 8
elem Id bytes
RecordLength = RecordLength + 10;
define cdrmodule BAFCT001
BEGIN
    Field Name: RecDescWord
    Field Type: HEX
    Field Length: 4 NIBBLE
    Field Value: RecordLength
    Field Name: RecDescWordZeros
    Field Type: HEX
    Field Length: 4 NIBBLE
    Field Value: 0
    Field Name: HexID
    Field Type: HEX
    Field Length: 2 NIBBLE
    Field Value: 0xAA
    Field Name: StructCodeModInd
    Field Type: HEX
    Field Length: 1 NIBBLE
    Field Value: structCodeModIndicator
    Field Name: StructCode
    Field Type: BCD
    Field Length: 4 NIBBLE
    Field Value: 0020
    Field Name: StructCodeSig
    Field Type: HEX
    Field Length: 1 NIBBLE
    Field Value: 0xC
    Field Name: CallType
    Field Type: BCD
    Field Length: 3 NIBBLE
    Field Value: 001
    Field Name: CallTypeSig
    Field Type: HEX
    Field Length: 1 NIBBLE
    Field Value: 0xC
    Field Name: SensorType
    Field Type: BCD
    Field Length: 3 NIBBLE
    Field Value: ToInt (sensorTypeDbLookupVal)
    Field Name: SensorTypeSig
    Field Type: HEX
    Field Length: 1 NIBBLE
    Field Value: 0xC
    Field Name: SensorID_POI
    Field Type: HEX
    Field Length: 1 NIBBLE
    Field Value: 0x0
    Field Name: SensorID
    Field Type: BCD
    Field Length: 6 NIBBLE
    Field Value: ToInt (sensorIDDbLookupVal)
    Field Name: SensorIDSig
    Field Type: HEX
    Field Length: 1 NIBBLE
    Field Value: 0xC
    Field Name: RecordOffType
    Field Type: BCD
    Field Length: 3 NIBBLE
    Field Value: ToInt (recOffTypeDbLookupVal)
    Field Name: RecordOffTypeSig
    Field Type: HEX
    Field Length: 1 NIBBLE
    Field Value: 0xC
    -- This field includes the valid test indicator sub-field also.
    Field Name: RecordOffIdent
    Field Type: BCD
    Field Length: 7 NIBBLE
    Field Value: ToInt (recOffIdDbLookupVal)
    Field Name: RecordOffIdentSig
    Field Type: HEX
    Field Length: 1 NIBBLE
    Field Value: 0xC
    Field Name: ConnectDate
    Field Type: DATE_YMMDD
    Field Length: 5 NIBBLE
    Field Value: startTime
    Field Name: ConnectDateSig
    Field Type: HEX
    Field Length: 1 NIBBLE
    Field Value: 0xC
    -- The following 6 sub-fields belong to the Timing Indicator in
    the BAF record.
    Field Name: TimingInd.TimingGuardFlag
    Field Type: HEX
    Field Length: 1 NIBBLE
    Field Value: 0x0
    Field Name: TimingInd.ShPartyOffHookInd
    Field Type: HEX
    Field Length: 1 NIBBLE
    Field Value: 0x0
    Field Name: TimingInd.LDSPCA
    Field Type: HEX
    Field Length: 1 NIBBLE
    Field Value: LongDurParty
    Field Name: TimingInd.ChGuardInd
    Field Type: HEX
    Field Length: 1 NIBBLE
    Field Value: 0x0
    Field Name: TiMingInd.TimeStampErrInd
    Field Type: HEX
    Field Length: 1 NIBBLE
    Field Value: 0x0
    Field Name: TimingIndSig
    Field Type: HEX
    Field Length: 1 NIBBLE
    Field Value: 0xC
    Field Name: StudyIndicator
    Field Type: HEX
    Field Length: 8 NIBBLE
    Field Value: 0xC
    Field Name: CalledParOffHookInd
    Field Type: HEX
    Field Length: 1 NIBBLE
    Field Value: cldPrtOffHk
    Field Name: CalledParOffHookIndSig
    Field Type: HEX
    Field Length: 1 NIBBLE
    Field Value: 0xC
    Field Name: ServObsTraffSampleInd
    Field Type: HEX
    Field Length: 2 NIBBLE
    Field Value: 0xC
    Field Name: OperatorActionInd
    Field Type: HEX
    Field Length: 2 NIBBLE
    Field Value: 0xC
```

```
Field Name: ServFeatureCode
Field Type: BCD
Field Length: 3 NIBBLE
Field Value: featureCode
Field Name: ServFeatureCodeSig
Field Type: HEX
Field Length: 1 NIBBLE
Field Value: 0xC
Field Name: OriginNpa
Field Type: BCD
Field Length: 3 NIBBLE
Field Value: numOrigNpa
Field Name: OriginNpaSig
Field Type: HEX
Field Length: 1 NIBBLE
Field Value: 0xC
Field Name: OriginatingNum
Field Type: BCD
Field Length: 7 NIBBLE
Field Value: numOrigNxx
Field Name: OriginationNumSig
Field Type: HEX
Field Length: 1 NIBBLE
Field Value: 0xC
Field Name: OverseasInd
Field Type: BCD
Field Length: 1 NIBBLE
Field Value: IntCallInd
Field Name: OverseasIndSig
Field Type: HEX
Field Length: 1 NIBBLE
Field Value: 0xC
Field Name: TermNpa
Field Type: BCD
Field Length: 5 NIBBLE
Field Value: numDestNpa
Field Name: TermNpaSig
Field Type: HEX
Field Length: 1 NIBBLE
Field Value: 0xC
Field Name: TerminatingNum
Field Type: BCD
Field Length: 7 NIBBLE
Field Value: numDestNxx
Field Name: TerminatingNumSig
Field Type: HEX
Field Length: 1 NIBBLE
Field Value: 0xC
Field Name: ConnectTime
Field Type: TIME_HHMMSSS
Field Length: 7 NIBBLE
Field Value: startTime
Field Name: ConnectTimeSig
Field Type: HEX
Field Length: 1 NIBBLE
Field Value: 0xC
Field Name: ElapsedTimeConst
Field Type: HEX
Field Length: 1 NIBBLE
Field Value: 0x0
Field Name: ElapsedTime
Field Type: TIME_MMMMMSSS
Field Length: 8 NIBBLE
Field Value: BPUR.RecEndTime – BPUR.RecStartTime
Field Name: ElapsedTimeSig
Field Type: HEX
Field Length: 1 NIBBLE
Field Value: 0xC
Field Name: WATSInd
Field Type: HEX
Field Length: 2 NIBBLE
Field Value: 0xC
Field Name: MBI
Field Type: BCD
Field Length: 3 NIBBLE
Field Value: RecGen.MBI
Field Name: MBISig
Field Type: HEX
Field Length: 1 NIBBLE
Field Value: 0xC
-- End of BAFCT001
END
define cdrmodule LDM
BEGIN
    Field Name: LDModuleCode
    Field Type: BCD
    Field Length: 3 NIBBLE
    Field Value: 022
    Field Name: LDModuleCodeSig
    Field Type: HEX
    Field Length: 1 NIBBLE
    Field Value: 0xC
    Field Name: PresentDate
    Field Type: DATE_YMMDD
    Field Length: 5 NIBBLE
    Field Value: BPUR.RecEndTime
    Field Name: PresentDateSig
    Field Type: HEX
    Field Length: 1 NIBBLE
    Field Value: 0xC
    Field Name: PresentTime
    Field Type: TIME_HHMMSSS
    Field Length: 7 NIBBLE
    Field Value: BPUR.RecEndTime
    Field Name: PresentTimeSig
    Field Type: HEX
    Field Length: 1 NIBBLE
    Field Value: 0xC
-- End off Long duration module
END
define cdrmodule LNP
BEGIN
    Field Name: LNPModuleCode
    Field Type: BCD
    Field Length: 3 NIBBLE
    Field Value: 720
    Field Name: LNPModuleCodeSig
    Field Type: HEX
    Field Length: 1 NIBBLE
    Field Value: 0xc
    Field Name: PartyIdentifier
    Field Type: BCD
    Field Length: 3 NIBBLE
    Field Value: 002
    Field Name: PartyIdentSign
    Field Type: HEX
    Field Length: 1 NIBBLE
    Field Value: 0xC
    Field Name: LocationRoutingNumCons
    Field Type: HEX
    Field Length: 1 NIBBLE
    Field Value: 0x0
    Field Name: LocationRoutingNumber
    Field Type: STR2BCD
    Field Length: 10 NIBBLE
    Field Value: Trim (BRUR.LocRoutNum)
    Field Name: LocRoutingModuleCodeSig
    Field Type: HEX
    Field Length: 1 NIBBLE
    Field Value: 0xC
    Field Name: ServiceProIdentityConst
    Field Type: BCD
    Field Length: 1 NIBBLE
    Field Value: 0
    Field Name: ServiceProIdentity
    Field Type: BCD
    Field Length: 8 NIBBLE
    Field Value: RecGen.spid
    Field Name: ServiceProIdentitySig
    Field Type: HEX
    Field Length: 1 NIBBLE
    Field Value: 0xC
    Field Name: Location
    Field Type: HEX
    Field Length: 15 NIBBLE
    Field Value: 0x0
    Field Name: LocationSig
    Field Type: HEX
```

-continued
```
        Field Length: 1 NIBBLE
        Field Value: 0xC
    Field Name: SupportingInfo
    Field Type: BCD
    Field Length: 7 NIBBLE
    Field Value: 1010000
    Field Name: SupportingInfoSig
    Field Type: HEX
    Field Length: 1 NIBBLE
    Field Value: 0xC
-- End of LNP module
END
define cdrmodule origQosModule
BEGIN
    Field Name: origQosTimeModule
    Field Type: BCD
    Field Length: 3 NIBBLE
    Field Value: 998
    Field Name: origQosTimeModuleSig
    Field Type: HEX
    Field Length: 1 NIBBLE
    Field Value: 0xc
    Field Name: OrigQosHoldTimeConst
    Field Type: HEX
    Field Length: 1 NIBBLE
    Field Value: 0x0
    Field Name: OrigQosHoldTime
    Field Type: TIME_MMMMMSSS
    Field Length: 8 NIBBLE
    Field Value: origQosHoldTime
    Field Name: OrigQosHoldTimeSig
    Field Type: HEX
    Field Length: 1 NIBBLE
    Field Value: 0xc
    Field Name: OrigQosActiveTimeConst
    Field Type: HEX
    Field Length: 1 NIBBLE
    Field Value: 0x0
    Field Name: OrigQosActiveTime
    Field Type: TIME_MMMMMSSS
    Field Length: 8 NIBBLE
    Field Value: origQcsActiveTime
    Field Name: OrigQosActiveTimeSig
    Field Type: HEX
    Field Length: 1 NIBBLE
    Field Value: 0xc
-- End of Orig Qos Module
END
define cdrmodule termQosModule
BEGIN
    Field Name: termQosTimeModule
    Field Type: BCD
    Field Length: 3 NIBBLE
    Field Value: 999
    Field Name: termQosTimeModuleSig
    Field Type: HEX
    Field Length: 1 NIBBLE
    Field Value: 0xc
    Field Name: TermQosHoldTimeConst
    Field Type: HEX
    Field Length: 1 NIBBLE
    Field Value: 0x0
    Field Name: Term QosHoldTime
    Field Type: TIME_MMMMMSSS
    Field Length: 8 NIBBLE
    Field Value: termQosHoldTime
    Field Name: TermQosHoldTimeSig
    Field Type: HEX
    Field Length: 1 NIBBLE
    Field Value: 0xc
    Field Name: TermQosActiveTimeConst
    Field Type: HEX
    Field Length: 1 NIBBLE
    Field Value: 0x0
    Field Name: TermQosActiveTime
    Field Type: TIME_MMMMMSSS
    Field Length: 8 NIBBLE
    Field Value: termQosActiveTime
    Field Name: TermQosActiveTimeSig
```

-continued
```
    Field Type: HEX
    Field Length: 1 NIBBLE
    Field Value: 0xc
-- End of termQosModule
END
define cdrmodule FinalModule
BEGIN
    Field Name: FinModCode
    Field Type: HEX
    Field Length: 4 NIBBLE
    Field Value: 0xC
END
-- Process the main Call type 001 CDR and store the result.
var text Return Value=PROCESS (BAFCT001);
-- Selectivly append the required modules to the CDR.
if (LNPReqd == 1)
BEGIN
    Return Value=Return Value+PROCESS (LNP);
END
if (LongDurModReqd == 1)
BEGIN
    Return Value=Return Value+PROCESS (LDM);
END
-- QOS MODULE
if (origPresent == 1)
BEGIN
    Return Value=Return Value+PROCESS (origQosModule);
END
if (termPresent == 1)
BEGIN
    Return Value=Return Value+PROCESS (termQosModule);
END
-- Follwing is needed to add a proprietary module to BAF CDR
containing
-- Orig Element Id in ASCII format. It has 2 header bytes "AL"
for structure
-- code 1044 and n element Id bytes
ReturnValue = ReturnValue + "AL" + BPUR.OrigElmtId;
ReturnValue = ReturnValue + PROCESS (FinalModule);
-- Return the CDR with all the needed modules appended.
return ReturnValue;
```

Although the above has been described in terms of specific system hardware and software features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Figure 4:
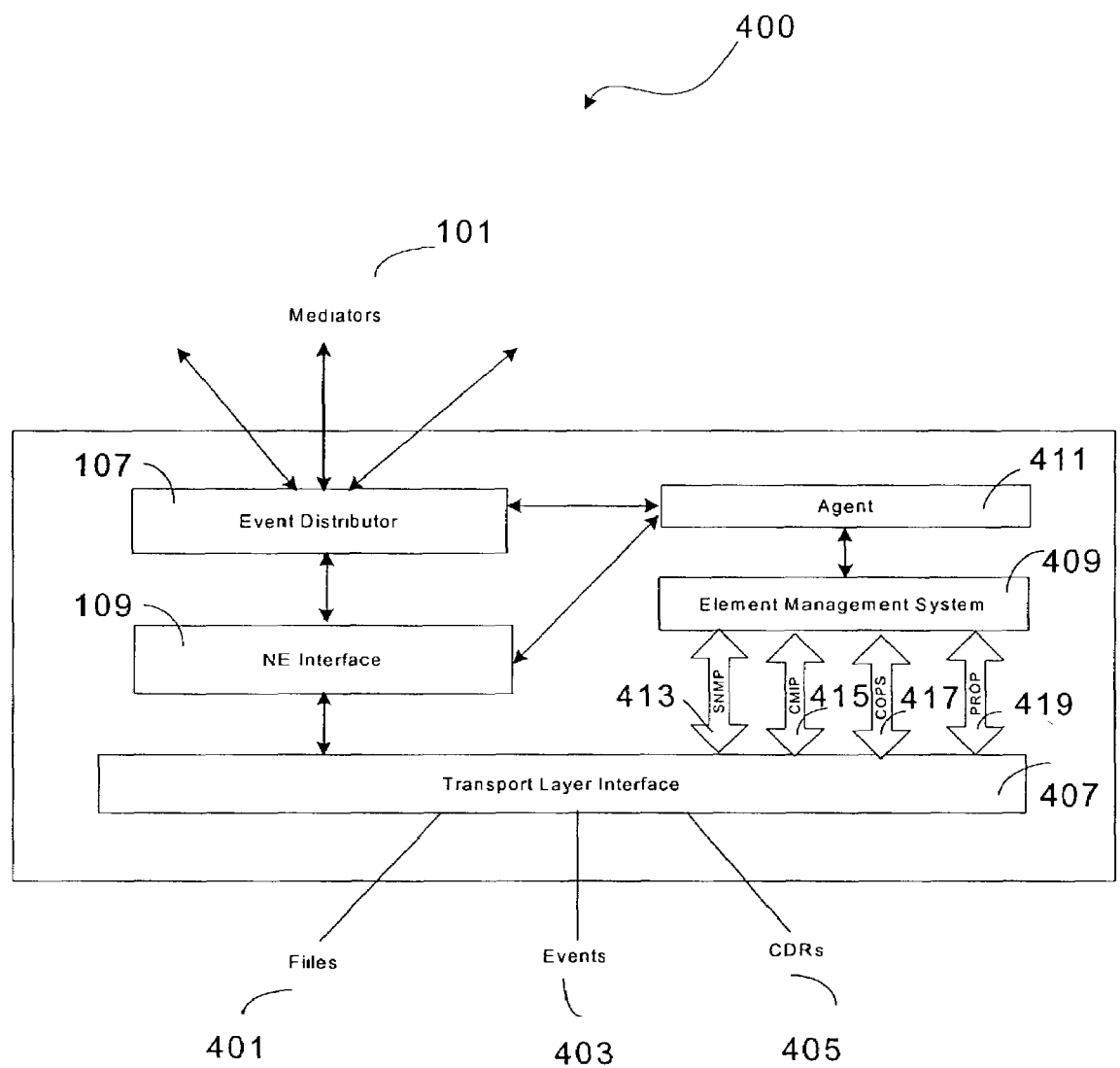
FIG. 4 is a simplified diagram of an adaptor according to an embodiment of the present invention.

FIG. 4 is a simplified diagram of an adaptor according to an embodiment of the present invention. This diagram is merely an example and should not unduly limit the scope of the claims herein. One of ordinary skill in the art would recognize many other variations, modifications, and alternatives. Like reference numerals are used herein as some of the other figures for easy cross-referencing, but are not intended to be limiting in any manner. As shown, the adaptor interfaces between network elements and mediator systems 101. The network elements provide information such as files 401, events 403, CDRs 405, and other information to the adaptor. In a specific embodiment, the adaptor interfaces with and receives events from the network elements based upon various packet based network technologies. Such events are then passed to one of the plurality of mediator systems for processing. In general, the adaptor has functional blocks, including a network element interface 109 and event distributor 107. The network element interface couples to the transport layer interface to accept the events from the network elements. Once the events have been accepted, the distributor determines which mediator should be given the event for further processing. That is, the distributor distributes the events. Other elements include an element management system 409, which couples to the transport layer interface. The management system communications to agent 411, which interfaces to the distributor and network element interface. The element management system communications through various formats, such as _Simple Network Management Protocol (SMNP), _Common Management Information Protocol (CMIP), Common Open Policy Service (COPS), Proprietary (PROP), and others. Further details of the network element interface and the event distributor are provided below.

In a specific embodiment, the network element interface supports many if not all protocols required to interface with many of not all network elements. That is, the interface is preferably; network element specific. As merely an example, the network element interface receives information from all of the network elements for a particular call, where the information may be using different protocols. The network element converts the information to a common protocol for use through the mediator systems. In a specific embodiment, the network element also provides acknowledgments, if desired, within a predetermined time limit, thereby reducing buffering requirements of the network elements. Of course, other functionality can also be provided depending upon the application.

In a specific embodiment, the event distributor connects one of the mediators to forward protocol events received from the network elements through the network interface. Preferably, the distributor uses the common protocol for communication with the mediators. Further details of such common protocol can be found throughout the present specification and more particularly below. As merely an example, the distributor forwards the events for a call to one of the mediators based upon a predefined policy. Such policy may be based upon network factors such as load balancing, fault tolerance, and the like, including external and internal network conditions. Preferably, the distributor uses the caller or call identification or ID to track the events through the network or networks. That is, one call often provides many or multiple events being generated as the call traverses through one or more different network elements, which are involved in processing the call. Preferably, all of the events for the call are provided to only one mediator for tracking purposes. The event distributor runs a process (which involves an algorithm) to ensure that all of such events for the call are provided to only one of the mediators that has been assigned to the call.

In an alternative embodiment, the system provides for a fault tolerant scheme using two or more adaptors. That is, there may be a primary adaptor and a secondary or backup adaptor. In a specific embodiment, a portion of the events for a call arrive at a primary adaptor. Other portions of the events or other events arrive at a secondary adaptor. Alternatively, there may be even more adaptors, depending upon the embodiment, each of the adaptors used for the particular call communication to each other to ensure that the events from any one of the adaptors are provided to only one of the mediators. Of course, one of ordinary skill in the art would recognize many other variations, modifications, and alternatives.

Figure 5:
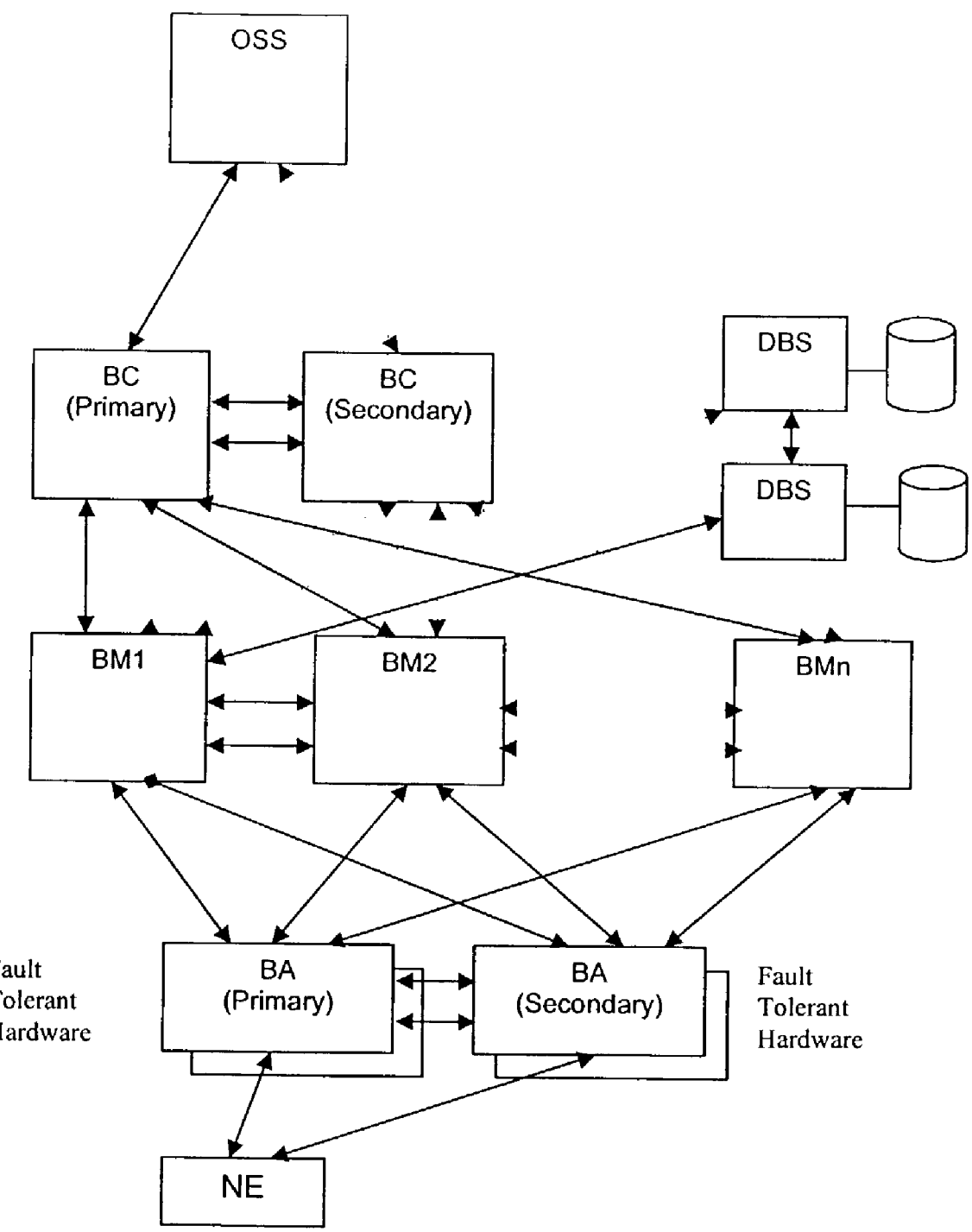
FIG. 5 is a simplified flow diagram of a fault tolerance process according to an embodiment of the present invention.

FIG. 5 is a simplified flow diagram of a fault tolerance process 500 according to an embodiment of the present invention. This diagram is merely an example and should not unduly limit the scope of the claims herein. One of ordinary skill in the art would recognize many other variations, modifications, and alternatives. Like reference numerals are used herein as some of the other figures for easy cross-referencing, but are not intended to be limiting in any manner. In order to provide a fault tolerant system and process events without loosing any information in case of any component failure, all the machines in the system are connected to other machines through two Ethernet link, depending on the communication requirements among the machines. This ensures that the communication is not broken even in the case of failure of the cable (cable pulled out) or failure of the Ethernet card on the machine. As already described above, Adaptors work in active-active configuration and both process incoming events coming to them. They also replicate event information to each other for all the events processed by them. This way at any given point of time, information is available with both the adaptors, until the receiving mediator acknowledges it. There could be 1 to N mediators and the load of one mediator is shared by other mediators in case of failure of the mediator. To avoid loss of information at mediator level all data is stored on persistent storage before acknowledgement is sent to adaptor. Correlators work in 1+1 configuration and standby correlator takes care of data processing in case of failure of the correlator. The information which was being processed by the failed correlator at the time of failure, is restored by the standby correlator from the persistent storage. This combination of the various components ensures that the system is fully fault tolerant and scalable. More mediators can be added to the system dynamically based on the system load. Database fault tolerance is achieved by having three database machines called primary, secondary and hot standby. Any component writing data to database for persistent storage writes it to both primary and secondary. If any of primary or secondary database fails, data is available through other machine and nothing is lost. Hot standby machine takes over the activities of the failed machine, in case of failure of either primary or secondary.

Although the above has been described in terms of specific system hardware and software features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

Figure 6:
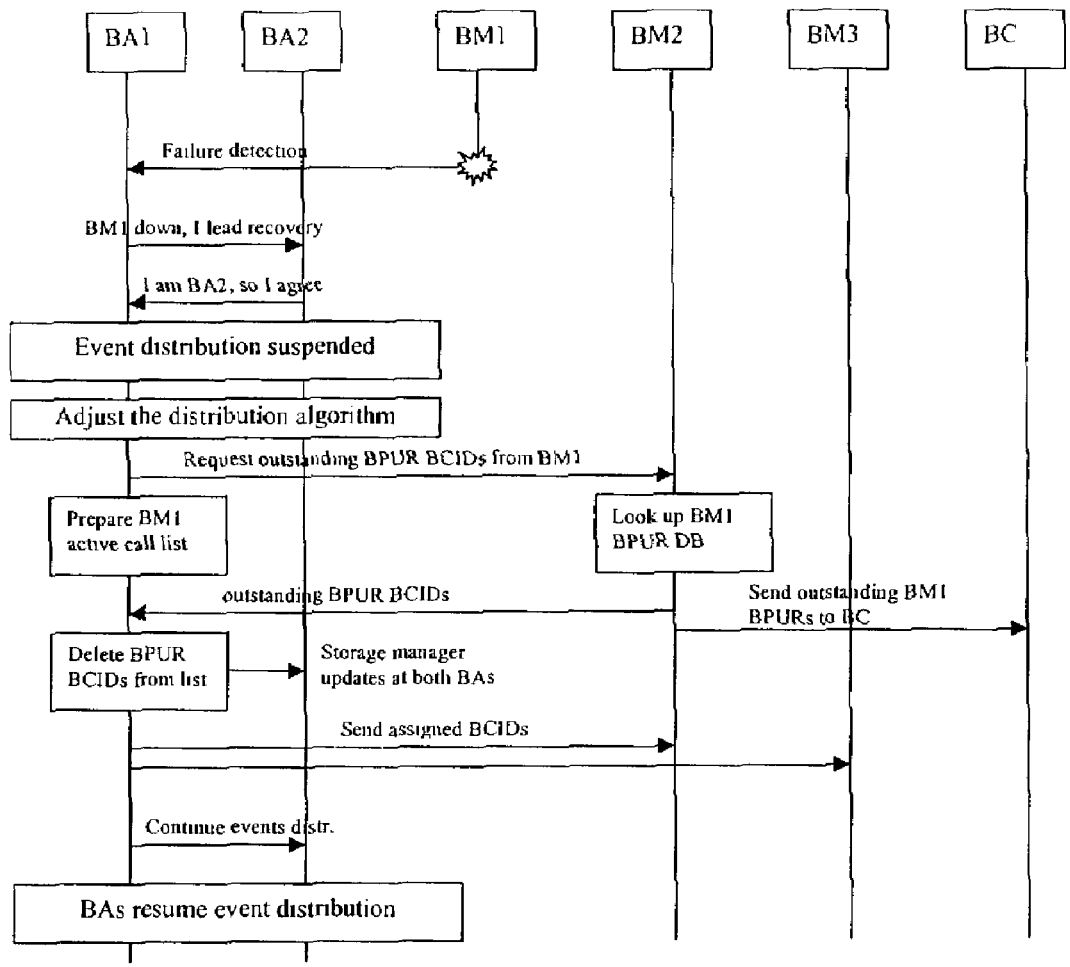
FIG. 6 is a more detailed diagram of a fault tolerance process according to an embodiment of the present invention.

FIG. 6 is a more detailed diagram of a fault tolerance process according to an embodiment of the present invention. This diagram is merely an example and should not unduly limit the scope of the claims herein. One of ordinary skill in the art would recognize many other variations, modifications, and alternatives. Like reference numerals are used herein as some of the other figures for easy cross-referencing, but are not intended to be limiting in any manner. This figure shows the scenario for failure and recovery of the mediator. When a mediator e.g M1 fails, adaptor comes to know about it as there is heartbeat signal going between them. One of the adaptor, say A1, detects the failure of M1 and tells other adaptor (A2) that it will lead the recovery process (to avoid the race condition where both adaptors try to recover the failure of a mediator). A2 confirms this to A1. A1 suspends the event distribution activity and adjusts the distribution algorithm as per the predefined policy so as not to send events to M1. A1 requests the M2 for the list of outstanding Usage Records list. This list indicates to A1 that the events corresponding to those usage records had been processed by M1 before failing. A1 deletes all events related to the usage records lists received from M2. A1 prepares a list of all calls, which were active at M1 at the time of M1 failure. A1 divides this list for sending to mediators based on the current load of the mediators, so as to distribute the events, related to the calls, which were being processed by the M1 at the time of failure. The events are distributed to all the active mediators. This ensures that the events, which were being processed by the M1 at the time of failure are evenly distributed to all the active mediators based on their current load. After this A1 resumes distribution of new events in normal fashion.

Figure 7:
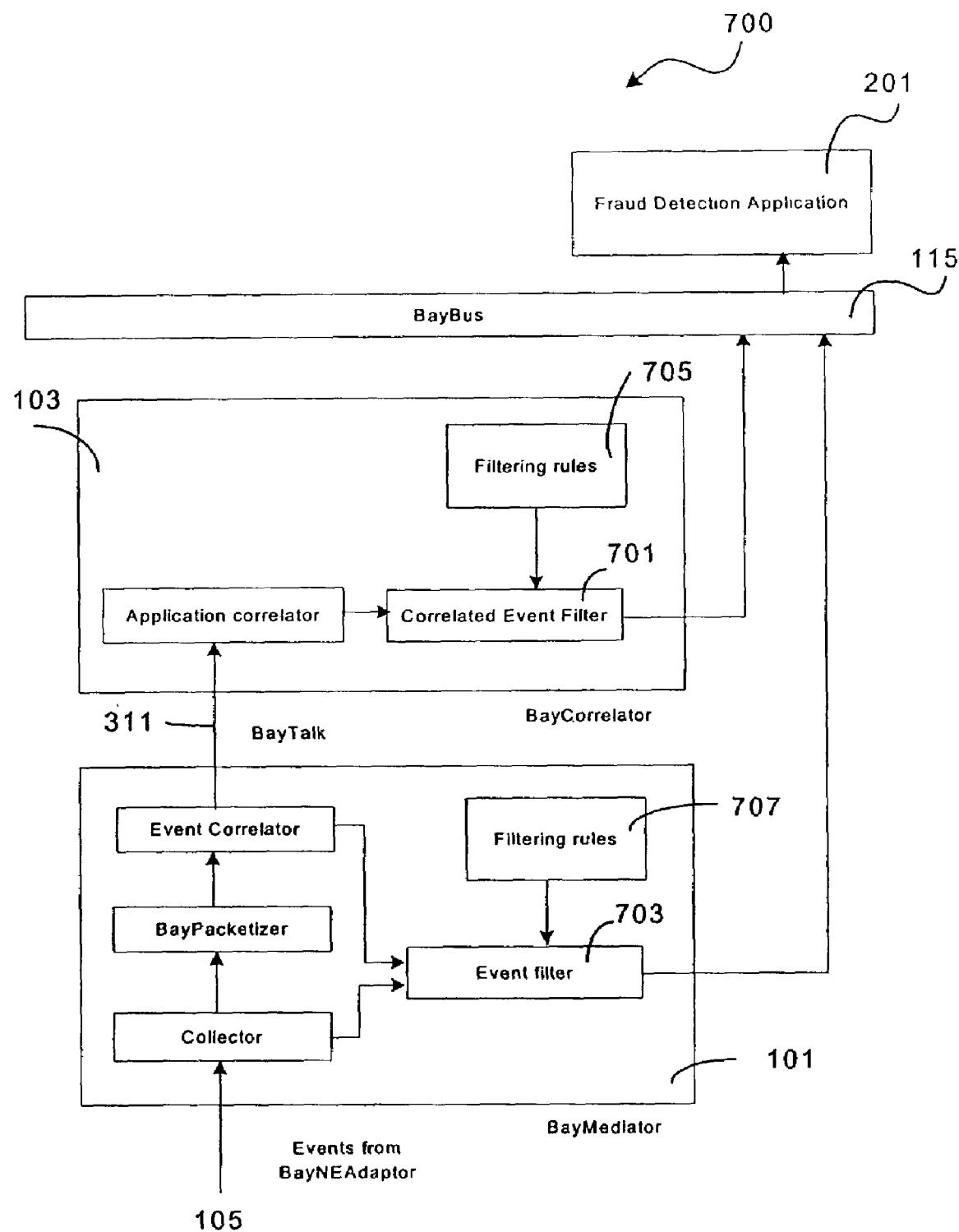
FIG. 7 is a flow diagram of a fraud detection module according to an embodiment of the present invention

FIG. 7 is a flow diagram of a fraud detection module according to an embodiment of the present invention. This diagram is merely an example and should not unduly limit the scope of the claims herein. One of ordinary skill in the art would recognize many other variations, modifications, and alternatives. Like reference numerals are used herein as some of the other figures for easy cross-referencing, but are not intended to be limiting in any manner. As shown, the system has fraud detection module 201, which is coupled to the correlator 103 and the mediator 105 via bus 115. The fraud module communications to the correlator and mediator via event filter 701 and event filter 703, respectively. Such filters are processing events based upon filtering rules 705 and filtering rules 707 respectively for the correlator and the mediator processes. As merely an example, events are provided from the adaptor 105 to the mediator 101. Such events correspond to one or more calls. Such events are filtered using filters 701 and 703 based upon rules. Such rules are provided to detect fraud using the communication network. When events pass through the filters based upon the rules and gets filtered. Filtered events traverse to the fraud detection application. The application detects the fraud almost instantaneously or in real time, which identifies the fraud when the fraudulent call has been initiated. The correlator also has filters for identifying correlated events. The fraud detection application can be adapted to receive correlated events from the correlator, as it does raw events from the mediator.

EXAMPLES

To prove the principle and operation of the present invention, we have implemented selected aspects of the invention using computer code and hardware. The example below we have provided sample events that are correlated for generating user records, which are then used to generate call data records. Such example has been provided in outline format below. Of course, one of ordinary skill in the art would recognize many other variations, modifications, and alternatives. Various features are provided under the headings below, which are not intended to be limiting.

Events Input and CDR Output

Following is a description of how raw input events are correlated and a consolidated CDR is generated.

Example 1

ON-TO-ON CALL TYPE

Expected Events in each half leg of a call are:
1. Signaling Start
2. Qos Reserve
3. Qos Commit
4. Call Answer
5. Signaling Stop
6. Call Disconnect
7. Qos Release Each half-of-a-call is identified by Billing Correlation ID (BCID) which in following example are:
7.1 Originating Call Leg BCID: 1011028443-CMS11111-0
7.2 Terminating Call Leg BCID: 1011028443-CMS22222-0

Usage Record (UR) is generated for each half-of-a-call which contains all necessary information required for generating CDRs. URs are generated by Mediator. URs are further correlated to generate BAF CDR for the identified call type. Correlation occurs in Correlator.

RAW EVENTS

Each raw event is illustrated along with its HEX-dump and decoded format.

ON-To-ON Call

SIGNALING STOP

| | |
|---|---|
| Context | 1 |
| Storage time | 190433 |
| Net technology id | 1 |
| Event type | 2 |
| Error code | 0 |
| BCI value | 1011028443-CMS11111-0 |

1a 44 00 00 11 8b 01 3e 00 01 3c 43 11 db 43 4d 53 31 31 31
31 31 00 00 00 00 00 02 00 01 43 4d 53 31 31 31 31 31 00 00
00 01 32 30 30 32 30 31 31 34 31 37 31 34 30 33 2e 31 31 37
00 00 00 00 00 00 02 00 1a 18 00 00 11 8b 0d 12 3c 43 11 db
43 4d 53 32 32 32 32 32 00 00 00 00 1a 10 00 00 11 8b 31 0a
00 00 00 00 00 00 00 01

| | |
|---|---|
| Context | 1 |
| Storage time | 190433 |
| Net technology id | 1 |
| Event type | 2 |
| Error code | 0 |
| BCI value | 1011028443-CMS11111-0 |
| Related BCI Time Stamp | 1011028443-CMS22222-0 |
| FEID | 1 |

QoS COMMIT

| | |
|---|---|
| Context | 1 |
| Storage time | 90663 |
| Net technology id | 1 |
| Event type | 19 |
| Error code | 0 |
| BCI value | 1011028443-CMS11111-0 |

1a 44 00 00 11 8b 01 3e 00 01 3c 43 11 db 43 4d 53 31 31 31
31 31 00 00 00 00 00 13 00 02 20 20 20 43 4d 54 53 31 00 00
00 01 32 30 30 32 30 31 31 34 31 37 31 34 30 33 2e 31 31 37
00 00 00 00 00 00 02 00 1a 0c 00 00 11 8b 1a 06 00 00 04 d2
1a 24 00 00 11 8b 20 1e 00 00 00 0d 41 42 43 44 00 00 00 01
00 00 00 01 00 00 00 01 00 00 00 01 00 00 00 01

| | |
|---|---|
| context | 1 |
| Storage time | 90663 |
| Net technology id | 1 |
| Event type | 19 |
| Error code | 0 |
| BCI value | 1011028443-CMS11111-0 |
| MTA udp port num | 1234 |
| Qos Descr | |
| Status Bit Mask | 13 |
| Service Name | ABCD |
| uiServFlwSchdType | 1 |
| Nominal Grant Interval | 1 |
| Tolerated Grant Jitter | −1 |
| Grants Per Interval | −1 |
| Unsolicited Grant Size | −1 |
| Traffic Priority | −1 |

| ON-TO-ON CALL TYPE | |
|---|---|
| Max Sustained Rate | −1 |
| Sustained Traffic Rate | −1 |
| Max Traffic Burst | −1 |
| Min Reserved Traffic Rate | −1 |
| Max Concatenated Burst | −1 |
| Request/Transmission Policy | −1 |
| Nominal Polling Interval | −1 |
| Tolerated Poll Jitter | −1 |
| Ip Type of Service Override | −1 |
| Max Downstream Latency | −1 |
| CALL ANSWER | |
| Context | 1 |
| Storage time | 311367 |
| Net technology id | 1 |
| Event type | 15 |
| Error code | 0 |
| BCI value | 1011028443-CMS11111-0 |
| 1a 44 00 00 11 8b 01 3e 00 01 3c 43 11 db 43 4d 53 31 31 31 | |
| 31 31 00 00 00 00 00 0f 00 01 43 4d 53 31 31 31 31 00 00 | |
| 00 02 32 30 30 32 30 31 31 34 31 37 31 34 30 33 2e 31 31 37 | |
| 00 00 00 00 00 00 05 00 1a 1c 00 00 11 8b 05 16 20 20 20 20 | |
| 20 20 20 20 20 20 32 30 31 32 32 30 31 31 31 31 1a 1c 00 00 | |
| 11 8b 19 16 20 20 20 20 20 20 20 20 20 31 31 31 31 31 31 | |
| 31 31 31 33 1a 1c 00 00 11 8b 10 16 20 20 20 20 20 20 20 | |
| 20 20 20 20 20 33 34 34 36 35 36 1a 18 00 00 11 8b 0d 12 | |
| 3c 43 11 db 43 4d 53 32 32 32 32 32 00 00 00 00 1a 10 00 00 | |
| 11 8b 31 0a 00 00 00 00 00 00 00 01 | |
| Context | 1 |
| Storage time | 311367 |
| Net technology id | 1 |
| Event type | 15 |
| Error code | 0 |
| BCI value | 1011028443-CMS11111-0 |
| Charge Number | 344656 |
| Related BCI Time Stamp | 1011028443-CMS22222-0 |
| FEID | 1 |
| QOS RESERVE | |
| Context | 1 |
| Storage time | 992550 |
| Net technology id | 1 |
| Event type | 7 |
| Error code | 0 |
| BCI value | 1011028443-CMS11111-0 |
| 1a 44 00 00 11 8b 01 3e 00 01 3c 43 11 db 43 4d 53 31 31 31 | |
| 31 31 00 00 00 00 00 07 00 02 20 20 20 43 4d 54 53 31 00 00 | |
| 00 00 32 30 30 32 30 31 31 34 31 37 31 34 30 33 2e 31 31 37 | |
| 00 00 00 00 00 02 00 1a 18 00 00 11 8b 20 12 00 00 00 0d | |
| 41 42 43 44 00 00 00 01 00 00 00 01 1a 0c 00 00 11 8b 1a 06 | |
| 00 00 04 d2 | |
| Context | 1 |
| Storage time | 992550 |
| Net technology Id | 1 |
| Event type | 7 |
| Error code | 0 |
| BCI value | 1011028443-CMS11111-0 |
| Qos Descr | |
| Status Bit Mask | 13 |
| Service Name | ABCD |
| uiServFlwSchdType | 1 |
| Nominal Grant Interval | 1 |
| Tolerated Grant Jitter | −1 |
| Grants Per Interval | −1 |
| Unsolicited Grant Size | −1 |
| Traffic Priority | −1 |
| Max Sustained Rate | −1 |
| Sustained Traffic Rate | −1 |
| Max Traffic Burst | −1 |
| Min Reserved Traffic Rate | −1 |
| Max Concatenated Burst | −1 |
| Request/Transmission Policy | −1 |
| Nominal Polling Interval | −1 |
| Tolerated Poll Jitter | −1 |
| Ip Type of Service Override | −1 |
| Max Downstream Latency | −1 |
| MTA udp port num | 1234 |

| ON-TO-ON CALL TYPE | |
|---|---|
| SIGNALING START | |
| Context | 1 |
| Storage time | 992500 |
| Net technology Id | 1 |
| Event type | 1 |
| Error code | 0 |
| BCI value | 1011028443-CMS11111-0 |
| 1a 44 00 00 11 8b 01 3e 00 01 3c 43 11 db 43 4d 53 31 31 31 | |
| 31 31 00 00 00 00 00 01 00 01 43 4d 53 31 31 31 31 31 00 00 | |
| 00 00 32 30 30 32 30 31 31 34 31 37 31 34 30 33 2e 39 36 30 | |
| 00 00 00 00 00 00 06 00 1a 0a 00 00 11 8b 25 04 00 01 1a 0e | |
| 00 00 11 8b 03 08 61 62 63 64 65 66 1a 1c 00 00 11 8b 04 16 | |
| 20 20 20 20 20 20 20 20 20 20 31 31 31 31 31 31 31 31 31 31 | |
| 1a 1c 00 00 11 8b 05 16 20 20 20 20 20 20 20 20 20 20 31 31 | |
| 31 32 32 32 32 32 32 32 1a 1c 00 00 11 8b 16 16 20 20 20 20 | |
| 20 20 20 20 20 20 33 33 33 35 36 37 38 35 34 33 1a 1c 00 00 | |
| 11 8b 19 16 20 20 20 20 20 20 20 20 20 20 20 20 20 20 20 31 | |
| 32 33 34 35 | |
| Context | 1 |
| Storage time | 992500 |
| Net technology id | 1 |
| Event type | 1 |
| Error code | 0 |
| BCI value | 1011028443-CMS11111-0 |
| Direction indicator | 1 |
| Mta End Point Name | abcdef |
| CALLING PARTY NUMBER | 1111111111 |
| CALLED PARTY NUMBER | 1112222222 |
| Location Rout Number | 3335678543 |
| Routing Number | 12345 |
| CALL DISCONNECT | |
| Context | 1 |
| Storage time | 311927 |
| Net technology id | 1 |
| Event type | 16 |
| Error code | 0 |
| BCI value | 1011028443-CMS11111-0 |
| 1a 44 00 00 11 8b 01 3e 00 01 3c 43 11 db 43 4d 53 31 31 31 | |
| 31 31 00 00 00 00 00 10 00 02 20 20 20 43 4d 54 53 31 00 00 | |
| 00 02 32 30 30 32 30 31 31 34 31 37 31 34 30 33 2e 31 31 37 | |
| 00 00 00 00 00 00 01 00 1a 0e 00 00 11 8b 0b 08 04 d2 00 00 | |
| 10 e1 | |
| Context | 1 |
| Storage time | 311927 |
| Net technology id | 1 |
| Event type | 16 |
| Error code | 0 |
| BCI value | 1011028443-CMS11111-0 |
| CTC | |
| Source Doc. | 1234 |
| Cause Code | 4321 |
| QOS RELEASE | |
| Context | 1 |
| Storage time | 311416 |
| Net technology id | 1 |
| Event type | 8 |
| Error code | 0 |
| BCI value | 1011028443-CMS11111-0 |
| 1a 44 00 00 11 8b 01 3e 00 01 3c 43 11 db 43 4d 53 31 31 31 | |
| 31 31 00 00 00 00 00 08 00 02 20 20 20 43 4d 54 53 31 00 00 | |
| 00 03 32 30 30 32 30 31 31 34 31 37 31 34 30 33 2e 31 31 37 | |
| 00 00 00 00 00 02 00 1a 24 00 00 11 8b 20 1e 00 00 00 0d | |
| 41 42 43 44 00 00 00 01 00 00 00 01 00 00 00 01 00 00 00 01 | |
| 00 00 00 01 1a 0c 00 00 11 8b 1e 06 00 00 0d 5d | |
| Context | 1 |
| Storage time | 311416 |
| Net technology id | 1 |
| Event type | 8 |
| Error code | 0 |
| BCI value | 1011028443-CMS11111-0 |
| Qos Descr | |
| Status Bit Mask | 13 |
| Service Name | ABCD |
| uiServFlwSchdType | 1 |

| ON-TO-ON CALL TYPE | |
|---|---|
| Nominal Grant Interval | 1 |
| Tolerated Grant Jitter | −1 |
| Grants Per Interval | −1 |
| Unsolicited Grant Size | −1 |
| Traffic Prority | −1 |
| Max Sustained Rate | −1 |
| Sustained Traffic Rate | −1 |
| Max Traffic Burst | −1 |
| Min Reserved Traffic Rate | −1 |
| Max Concatenated Burst | −1 |
| Request/Transmission Policy | −1 |
| Nominal Polling Interval | −1 |
| Tolerated Poll Jitter | −1 |
| Ip Type of Service Override | −1 |
| Max Downstream Latency | −1 |
| SF Id | 3421 |
| SIGNALING STOP | |
| Context | 1 |
| Storage time | 190683 |
| Net technology id | 1 |
| Event type | 2 |
| Error code | 0 |
| BCI value | 1011028443-CMS22222-0 |
| 1a 44 00 00 11 8b 01 3e 00 01 3c 43 11 db 43 4d 53 32 32 32 | |
| 32 32 00 00 00 00 00 02 00 01 43 4d 53 32 32 32 32 32 00 00 | |
| 00 01 32 30 30 32 30 31 31 34 31 37 31 34 30 33 2e 31 31 37 | |
| 00 00 00 00 00 02 00 1a 18 00 00 11 8b 0d 12 3c 43 11 db | |
| 43 4d 53 31 31 31 31 31 00 00 00 00 1a 10 00 00 11 8b 31 0a | |
| 00 00 00 00 00 bc 61 4e | |
| Context | 1 |
| Storage time | 190683 |
| Net technology id | 1 |
| Event type | 2 |
| Error code | 0 |
| BCI value | 1011028443-CMS22222-0 |
| Related BCI Time Stamp | 1011028443-CMS11111-0 |
| FEID | 12345678 |
| QOS COMMIT | |
| Context | 1 |
| Storage time | 190647 |
| Net technology id | 1 |
| Event type | 19 |
| Error code | 0 |
| BCI value | 1011028443-CMS22222-0 |
| 1a 44 00 00 11 8b 01 3e 00 01 3c 43 11 db 43 4d 53 32 32 32 | |
| 32 32 00 00 00 00 00 13 00 02 20 20 20 43 4d 54 53 33 00 00 | |
| 00 01 32 30 30 32 30 31 31 34 31 37 31 34 30 33 2e 31 31 37 | |
| 00 00 00 00 00 02 00 1a 0c 00 00 11 8b 1a 06 00 00 04 d2 | |
| 1a 24 00 00 11 8b 20 1e 00 00 00 0d 41 42 43 44 00 00 00 01 | |
| 00 00 00 01 00 00 00 01 00 00 00 01 00 00 00 01 | |
| Context | 1 |
| Storage time | 190647 |
| Net technology id | 1 |
| Event type | 19 |
| Error code | 0 |
| BCI value | 1011028443-CMS22222-0 |
| MTA udp port num | 1234 |
| Qos Descr | |
| Status Bit Mask | 13 |
| Service Name | ABCD |
| uiServFlwSchdType | 1 |
| Nominal Grant Interval | 1 |
| Tolerated Grant Jitter | −1 |
| Grants Per Interval | −1 |
| Unsolicited Grant Size | −1 |
| Traffic Prority | −1 |
| Max Sustained Rate | −1 |
| Sustained Traffic Rate | −1 |
| Max Traffic Burst | −1 |
| Mm Reserved Traffic Rate | −1 |
| Max Concatenated Burst | −1 |
| Request/Transmission Policy | −1 |
| Nominal Polling Interval | −1 |
| Tolerated Poll Jitter | −1 |
| Ip Type of Service Override | −1 |

| ON-TO-ON CALL TYPE | |
|---|---|
| Max Downstream Latency | −1 |
| CALL ANSWER | |
| Context | 1 |
| Storage time | 312001 |
| Net technology id | 1 |
| Event type | 15 |
| Error code | 0 |
| BCI value | 1012028443-CMS22222-0 |
| 1a 44 00 00 11 8b 01 3e 00 01 3c 43 11 db 43 4d 53 32 32 32 | |
| 32 32 00 00 00 00 00 0f 00 01 43 4d 53 32 32 32 32 32 00 00 | |
| 00 02 32 30 30 32 30 31 31 34 31 37 31 34 30 33 2e 31 31 37 | |
| 00 00 00 00 00 00 05 00 1a 1c 00 00 11 8b 05 16 20 20 20 20 | |
| 20 20 20 20 20 20 20 32 30 31 32 32 30 31 31 31 31 1a 1c 00 00 | |
| 11 8b 19 16 20 20 20 20 20 20 20 20 20 20 20 31 31 31 31 31 31 | |
| 31 31 31 33 1a 1c 00 00 11 8b 10 16 20 20 20 20 20 20 20 | |
| 20 20 20 20 20 33 34 34 36 35 36 1a 18 00 00 11 8b 0d 12 | |
| 3c 43 11 db 43 4d 53 31 31 31 31 00 00 00 00 1a 10 00 00 | |
| 11 8b 31 0a 00 00 00 00 00 bc 61 4e | |
| Context | 1 |
| Storage time | 312001 |
| Net technology Id | 1 |
| Event type | 15 |
| Error code | 0 |
| BCI value | 1011028443-CMS22222-0 |
| Charge Number | 344656 |
| Related BCI Time Stamp | 1011028443-CMS11111-0 |
| FEID | 12345678 |
| QOS RESERVE | |
| Context | 1 |
| Storage time | 190667 |
| Net technology id | 1 |
| Event type | 7 |
| Error code | 0 |
| BCI value | 1011028443-CMS22222-0 |
| 1a 44 00 00 11 8b 01 3e 00 01 3c 43 11 db 43 4d 53 32 32 32 | |
| 32 32 00 00 00 00 00 07 00 02 20 20 20 43 4d 54 53 33 00 00 | |
| 00 00 32 30 30 32 30 31 31 34 31 37 31 34 30 33 2e 31 31 37 | |
| 00 00 00 00 00 02 00 1a 18 00 00 11 8b 20 12 00 00 00 0d | |
| 41 42 43 44 00 00 00 01 00 00 00 01 1a 0c 00 00 11 8b 1a 06 | |
| 00 00 04 d2 | |
| Context | 1 |
| Storage time | 190667 |
| Net technology id | 1 |
| Event type | 7 |
| Error code | 0 |
| BCI value | 1011028443-CMS22222-0 |
| Qos Descr | |
| Status Bit Mask | 13 |
| Service Name | ABCD |
| uiServFlwSchdType | 1 |
| Nominal Grant Interval | 1 |
| Tolerated Grant Jitter | −1 |
| Grants Per Interval | −1 |
| Unsolicited Grant Size | −1 |
| Traffic Priority | −1 |
| Max Sustained Rate | −1 |
| Sustained Traffic Rate | −1 |
| Max Traffic Burst | −1 |
| Min Reserved Traffic Rate | −1 |
| Max Concatenated Burst | −1 |
| Request/Transmission Policy | −1 |
| Nominal Polling Interval | −1 |
| Tolerated Poll Jitter | −1 |
| ip Type of Service Override | −1 |
| Max Downstream Latency | −1 |
| MTA udp port num | 1234 |
| SIGNALING START | |
| Context | 1 |
| Storage time | 190613 |
| Net technology id | 1 |
| Event type | 1 |
| Error code | 0 |
| BCI value | 1011028443-CMS22222-0 |
| 1a 44 00 00 11 8b 01 3e 00 01 3c 43 11 db 43 4d 53 32 32 32 | |

ON-TO-ON CALL TYPE (continued)

```
32 32 00 00 00 00 00 01 00 01 43 4d 53 32 32 32 32 32 00 00
00 00 32 30 30 32 30 31 31 34 31 37 31 34 30 33 2e 31 31 37
00 00 00 00 00 00 06 00 1a 0a 00 00 11 8b 25 04 00 02 1a 0e
00 00 11 8b 03 08 61 62 63 64 65 66 1a 1c 00 00 11 8b 04 16
20 20 20 20 20 20 20 20 20 20 31 31 31 31 31 31 31 31 31 31
1a 1c 00 00 11 8b 05 16 20 20 20 20 20 20 20 20 20 20 32 32
32 32 32 32 32 32 32 32 1a 1c 00 00 11 8b 16 16 20 20 20 20
20 20 20 20 20 20 33 33 33 35 36 37 38 35 34 33 1a 1c 00 00
11 8b 19 16 20 20 20 20 20 20 20 20 20 20 20 20 20 20 20 31
32 33 34 35
```

| | |
|---|---|
| Context | 1 |
| Storage time | 190613 |
| Net technology id | 1 |
| Event type | 1 |
| Error code | 0 |
| BCI value | 1011028443-CMS22222-0 |
| Direction indicator | 2 |
| Mta End Point Name | abcdef |
| CALLING PARTY NUMBER | 1111111111 |
| CALLED PARTY NUMBER | 2222222222 |
| Location Rout Number | 3335678543 |
| Routing Number | 12345 |

CALL DISCONNECT

| | |
|---|---|
| Context | 1 |
| Storage time | 312104 |
| Net technology id | 1 |
| Event type | 16 |
| Error code | 0 |
| BCI value | 1011028443-CMS22222-0 |

```
1a 44 00 00 11 8b 01 3e 00 01 3c 43 11 db 43 4d 53 32 32 32
32 32 00 00 00 00 00 00 10 00 02 20 20 20 43 4d 54 53 33 00 00
00 02 32 30 30 32 30 31 31 34 31 37 31 34 30 33 2e 31 31 37
00 00 00 00 00 00 01 00 1a 0e 00 00 11 8b 0b 08 04 d2 00 00
10 e1
```

| | |
|---|---|
| Context | 1 |
| Storage time | 312104 |
| Net technology id | 1 |
| Event type | 16 |
| Error code | 0 |
| BCI value | 1011028443-CMS22222-0 |

CTC

| | |
|---|---|
| Source Doc. | 1234 |
| Cause Code | 4321 |

QOS RELEASE

| | |
|---|---|
| Context | 1 |
| Storage time | 312035 |
| Net technology id | 1 |
| Event type | 8 |
| Error code | 0 |
| BCI value | 1011028443-CMS22222-0 |

```
1a 44 00 00 11 8b 01 3e 00 01 3c 43 11 db 43 4d 53 32 32 32
32 32 00 00 00 00 00 08 00 02 20 20 20 43 4d 54 53 33 00 00
00 03 32 30 30 32 30 31 31 34 31 37 31 34 30 33 2e 31 31 37
00 00 00 00 00 00 02 00 1a 24 00 00 11 8b 20 1e 00 00 00 0d
41 42 43 44 00 00 00 01 00 00 00 01 00 00 00 01 00 00 00 01
00 00 00 01 1a 0c 00 00 11 8b 1e 06 00 00 0d 5d
```

| | |
|---|---|
| Context | 1 |
| Storage time | 312035 |
| Net technology id | 1 |
| Event type | 8 |
| Error code | 0 |
| BCI value | 1011028443-CMS22222-0 |
| Qos Descr | |
| Status Bit Mask | 13 |
| Service Name | ABCD |
| uiServFlwSchdType | 1 |
| Nominal Grant Interval | 1 |
| Tolerated Grant Jitter | −1 |
| Grants Per Interval | −1 |
| Unsolicited Grant Size | −1 |
| Traffic Priority | −1 |
| Max Sustained Rate | −1 |
| Sustained Traffic Rate | −1 |
| Max Traffic Burst | −1 |
| Min Reserved Traffic Rate | −1 |
| Max Concatenated Burst | −1 |
| Request/Transmission Policy | −1 |
| Nominal Polling Interval | −1 |
| Tolerated Poll Jitter | −1 |
| Ip Type of Service Override | −1 |
| Max Downstream Latency | −1 |
| SF Id | 3421 |

USAGE RECORDS

UR for both originating and terminating leg of a call. The Originating and Terminating end of call is determined from the Direction Indicator received in Signaling Start Event.

UR FOR ORIGINATING LEG

| | |
|---|---|
| Context | 0 |
| Storage time | 1011028445 |
| Module id | 3000 |
| Usage Record id | 1 |
| BCI value | 1011028443-CMS11111-0 |

USAGE RECORD HEADER

| | |
|---|---|
| BPE Type | 12 |
| BCI | 1011028443-CMS11111-0 |

FILLED BPIES . . .

| | |
|---|---|
| CallingPtyNum = | 1111111111 |
| ChargeNum = | 344656 |
| CalledPtyNum = | 1112222222 |
| OriginatingElmtType = | 1 |
| OriginatingElmtId = | CMS11111 |
| TerminatingElmtType = | 1 |
| TerminatingElmtId = | CMS11111 |
| LocationRoutingNum = | 3335678543 |
| OriginatingEndPtName = | abcdef |
| RelatedTxnBCI = | 1011028443-CMS22222-0 |
| RoutingNum = | 1 |
| OriginatingUdpPort = | 1234 |
| TxnStartTime = | (sec = 1011028443, usec = 117000) |
| TxnEndTime = | (sec = 1011028443, usec = 117000) |
| CauseCodeDoc = | 1234 |
| TerminationCause = | 4321 |
| RecType = | 1 |
| RecStartTime = | (sec = 1011028443, usec = 117000) |
| RecEndTime = | (sec = 1011028443, usec = 117000) |
| Terminating FEId = | 1 |
| Direction Indicator = | 1 |

UR FOR TERMINATING LEG

| | |
|---|---|
| Storage time | 1011028445 |
| Module id | 3000 |
| Usage Record id | 2 |
| BCI value | 1011028443-CMS22222-0 |

USAGE RECORD HEADER

| | |
|---|---|
| BPE Type | 12 |
| BCI | 1011028443-CMS22222-0 |

FILLED BPIES . . .

| | |
|---|---|
| CallingPtyNum = | 1111111111 |
| ChargeNum = | 344656 |
| CalledPtyNum = | 2222222222 |
| OriginatingElmtType = | 1 |
| OriginatingElmtId = | CMS22222 |
| TerminatingElmtType = | 1 |
| TerminatingElmtId = | CMS22222 |
| LocationRoutingNum = | 3335678543 |
| OriginatingEndPtName = | abcdef |
| RelatedTxnBCI = | 1011028443-CMS11111-0 |
| RoutingNum = | 1 |
| OriginatingUdpPort = | 1234 |
| TxnStartTime = | (sec = 1011028443, usec = 117000) |
| TxnEndTime = | (sec = 1011028443, |

-continued

ON-TO-ON CALL TYPE

| | |
|---|---|
| | usec = 117000) |
| CauseCodeDoc = | 1234 |
| TerminationCause = | 4321 |
| RecType = | 1 |
| RecStartTime = | (sec = 1011028443, usec = 117000) |
| RecEndTime = | (sec = 1011028443, usec = 117000) |
| Originating FEId = | 12345678 |
| Direction Indicator = | 2 |
| CDR | |
| Call Type = | 110 |
| Sensor Type = | 001 |
| Sensor ID = | 0000000 |
| Recording Office Type = | 222 |
| Recording Office Identification = | 0222333 |
| Connect Date \YYYY/MM/DD\= | 2002/01/14 |
| Timing Indicator = | 00000 |
| Study Indicator = | 0000000 |
| Called Party Off-Hook Indicator = | 0 |
| Service Observed Traffic Sampled = | 0 |
| Operator Action = | 0 |
| Service Feature = | 000 |
| Originating NPA = | 111 |
| Originating Number = | 1111111 |
| Overseas Indicator = | 1 |
| Terminating NPA = | 00000 30 380 352 DS |
| Terminating Number = | 0012345 |
| Connect Time \HH:MM:SS.S\= | 17:10:40.1 |
| Elapsed Time = | 000000 min, 00.0 sec |
| IC/NC Prefix = | 00000 |
| Carrier Connect Date \YYYY/MM/DD\= | 2002/01/14 |
| Carrier Connect Time \HH:MM:SS.S\= | 17:10:40.1 |
| Carrier Elapsed Time = | 000000 min, 00.0 sec |
| IC/NC Call Event Status = | 000 |
| Trunk Group Number = | 00000 |
| Routing Indicator = | 0 |
| Dialing and PreSubscription Indicator = | 4 |
| ANI/CPN Indicator = | 2 |

Example 2

ON-NETWORK TO-OFF NETWORK CALL

Originating Leg of a Call will contain following events:

8. Signaling Start
9. Qos Reserve
10. Qos Commit
11. Call Answer
12. Signaling Stop
13. Call Disconnect
14. Qos Release Terminating Leg of a call will contain following Events:

1. Signaling Start
2. Interconnect Start
3. Call Answer
4. Signaling Stop
5. Interconnect Stop Each half-of-a-call is identified by Billing Correlation ID (BCID) which in following example are:

15. Originating Call Leg BCID: 1011049414-CMS11111-0
16. Terminating Call Leg BCID: 1011049414-MGC12-0

Usage Record (UR) is generated for each half-of-a call which contains all necessary information required for generating CDRs. URs are generated by BayMediator. URs are further correlated to generate BAF CDR for identified call type. Correlation occurs in BayCorrelator.

PC Events

Each PacketCable event is illustrated along with its HEX-dump and decoded format

ON-To-OFF CALL

| | |
|---|---|
| SIGNALING STOP | |
| Context | :1 |
| Storage time | :212269 |
| Net technology id | :1 |
| Event type | :2 |
| Error code | :0 |
| BCI value | :1011049414-CMS11111-0 |
| Related BCI | |
| Time Stamp | :1011049414-MGC12-0 |
| FEID | :2 |
| QOS COMMIT | |
| Context | :1 |
| Storage time | :310365 |
| Net technology id | :1 |
| Event type | :19 |
| Error code | :0 |
| BCI value | :1011049414-CMS11111-0 |
| MTA udp port num | : 1234 |
| Qos Descr | |
| Status Bit Mask | : 13 |
| Service Name | : ABCD |
| UiServFlwSchdType | : 1 |
| Nominal Grant Interval | : 1 |
| Tolerated Grant Jitter | : −1 |
| Grants Per Interval | : −1 |
| Unsolicited Grant Size | : −1 |
| Traffic Prority | : −1 |
| Max Sustained Rate | : −1 |
| Sustained Traffic Rate | : −1 |
| Max Traffic Burst | : −1 |
| Min Reserved Traffic Rate | :−1 |
| Max Concatenated Burst | : −1 |
| Request/Transmission Policy | : −1 |
| Nominal Polling Interval | : −1 |
| Tolerated Poll Jitter | : −1 |
| Ip Type of Service Override | : −1 |
| Max Downstream Latency | : −1 |
| CALL ANSWER | |
| Context | :1 |
| Storage time | :311145 |
| Net technology id | :1 |
| Event type | :15 |
| Error code | :0 |
| BCI value | :1011049414-CMS11111-0 |
| Charge Number | :344656 |
| Related BCI | |
| Time Stamp | : 1011049414-MGC12-0 |
| FEID | : 2 |
| QOS RESERVE | |
| Context | :1 |
| Storage time | :212248 |
| Net technology id | :1 |
| Event type | :7 |
| Error code | :0 |
| BCI value | :1011049414-CMS11111-0 |
| Qos Descr | |
| Status Bit Mask | : 13 |
| Service Name | : ABCD |
| UiServFlwSchdType | : 1 |
| Nominal Grant Interval | : 1 |
| Tolerated Grant Jitter | : −1 |
| Grants Per Interval | : −1 |
| Unsolicited Grant Size | : −1 |
| Traffic Prority | : −1 |
| Max Sustained Rate | : −1 |
| Sustained Traffic Rate | : −1 |
| Max Traffic Burst | : −1 |
| Min Reserved Traffic Rate | :−1 |

```
  Max Concatenated Burst      : -1
  Request/Transmission Policy : -1
  Nominal Polling Interval    : -1
  Tolerated Poll Jitter       : -1
  Ip Type of Service Override : -1
  Max Downstream Latency      : -1
MTA udp port num              : 1234
SIGNALING START
Context                       :1
Storage time                  :212204
Net technology id             :1
Event type                    :1
Error code                    :0
BCI value                     :1011049414-CMS11111-0
Direction indicator           : 1
  Mta End Point Name          : abcdef
  CALLING PARTY NUMBER        : 1111111111
  CALLED PARTY NUMBER         : 1112222222
  Location Rout Number        : 3335678543
  Routing Number              : 1111112221
CALL DISCONNECT
Context                       :1
Storage time                  :311715
Net technology id             :1
Event type                    :16
Error code                    :0
BCI value                     :1011049414-CMS11111-0
CTC
  Source Doc.                 : 1234
  Cause Code                  : 4321
QOS RELEASE
Context                       :1
Storage time                  :311199
Net technology id             :1
Event type                    :8
Error code                    :0
BCI value                     :1011049414-CMS11111-0
Qos Descr
  Status Bit Mask             : 13
  Service Name                : ABCD
  UiServFlwSchdType           : 1
  Nominal Grant Interval      : 1
  Tolerated Grant Jitter      : -1
  Grants Per Interval         : -1
  Unsolicited Grant Size      : -1
  Traffic Priority            : -1
  Max Sustained Rate          : -1
  Sustained Traffic Rate      : -1
  Max Traffic Burst           : -1
  Min Reserved Traffic Rate   : -1
  Max Concatenated Burst      : -1
  Request/Transmission Policy : -1
  Nominal Polling Interval    : -1
  Tolerated Poll Jitter       : -1
  Ip Type of Service Override : -1
  Max Downstream Latency      : -1
SF Id                         : 3421
SIGNALING STOP
Context      :1
Storage time                  :212382
Net technology id    :1
Event type                    :2
Error code                    :0
BCI value                     :1011049414- MGC12-0
Related BCI
  Time Stamp                  :1011049414-CMS11111-0
  FEID                        :12345678
CALL ANSWER
Context      :1
Storage time                  :311757
Net technology id    :1
Event type                    :15
Error code                    :0
BCI value                     :1011049414- MGC12-0
Charge Number                 :344656
Related BCI
  Time Stamp                  :1011049414-CMS11111-0
  FEID                        :12345678
INTERCONNECT START
```

```
Context      :1
Storage time                  :311993
Net technology id    :1
Event type                    :13
Error code                    :0
BCI value                     :1011049414- MGC12-0
Carrier Id Code               : 1
Trunk Group ID
  Trunk Type                  : 0
  Trunk Num                   : 5
Routing Number                : 12345
SIGNALING START
Context                       :1
Storage time                  :212359
Net technology id             :1
Event type                    :1
Error code                    :0
BCI value                     :1011049414- MGC12-0
Direction indicator           : 2
Mta End Point Name            : abcdef
CALLING PARTY                 : 1111111111
NUMBER
CALLED PARTY                  : 2222222222
NUMBER
Location Rout Number          : 3335678543
Carrier Id Code               : 1
Routing Number                : 12345
Trunk Group ID
  Trunk Type                  : 0
  Trunk Num                   : 5
INTERCONNECT STOP
Context      :1
Storage time                  :312275
Net technology id             :1
Event type                    :14
Error code                    :0
BCI value                     :1011049414- MGC12-0
Carrier Id Code               : 1
Trunk Group ID
  Trunk Type                  : 0
  Trunk Num                   : 5
USAGE RECORD
                    UR FOR ORIGINATING LEG Context      :0
Storage time                  :1011049415
Module id    :3000
Usage Record id               :1
BCI value                     :1011049414-CMS11111-0
USAGE RECORD HEADER
BPE Type     : 12
BCI          : 1011049414-CMS11111-0
FILLED BPIES . . .
CallingPtyNum            =                111111
ChargeNum                =                         34
CalledPtyNum             =                111222
OriginatingElmtType      = 1
OriginatingElmtId        = CMS11111
TerminatingElmtType      = 1
TerminatingElmtId        = CMS11111
LocationRoutingNum       =                333567
OriginatingEndPtName           = abcdef
RelatedTxnBCI            = 1011049414- MGC12-0
RoutingNum               =                111111
OriginatingUdpPort       = 1234
TxnStartTime             = (sec = 1011049414, usec = 123000)
TxnEndTime               = (sec = 1011049414, usec = 123000)
CauseCodeDoc             = 1234
TerminationCause         = 4321
RecType                  = 1
RecStartTime             = (sec = 1011049414, usec = 123000)
RecEndTime               = (sec = 1011049414, usec = 123000)
Terminating FEId         = 2
Direction Indicator      = 1
                    UR FOR TERMINATING LEG Storage time                  :1011049415
Module id    :3000
Usage Record id               :2
```

```
BCI value      :1011049414- MGC12-0
USAGE RECORD HEADER
BPE Type       : 12
BCI            : 1011049414- MGC12-0
FILLED BPIES . . .
CallingPtyNum         =              111111
ChargeNum             =              34
CalledPtyNum          =              222222
OriginatingElmtType   = 3
OriginatingElmtId     =    MGC12
TerminatingElmtType   = 3
TerminatingElmtId     =    MGC12
LocationRoutingNum    =              333567
CarrierId             =    1
OriginatingTrunkType  = 0
OriginatingTrunkId    = 5
OriginatingEndPtName  = abcdef
RelatedTxnBCI         = 1011049414-CMS11111-0
RoutingNum =               1
InterconnectStartTime      = (sec = 1011049414, usec = 123000)
InterconnectEndTime        = (sec = 1011049414, usec = 123000)
TxnStartTime          = (sec = 1011049414, usec = 123000)
TxnEndTime            = (sec = 1011049414, usec = 123000)
RecType               = 1
RecStartTime          = (sec = 1011049414, usec = 123000)
RecEndTime            = (sec = 1011049414, usec = 123000)
Originating FEId      = 12345678
Direction Indicator   = 2
CDR
    Call Type      = 110
    Sensor Type  = 001
    Sensor ID    = 0000000
    Recording Office Type = 222
    Recording Office Identification        = 0222333
    Connect Date \ YYYY/MM/DD\             = 2002/01/14
    Timing Indicator                       = 00000
    Study Indicator                        = 0000000
    Called Party Off-Hook Indicator        = 0
    Service Observed Traffic Sampled       = 0
    Operator Action                        = 0
    Service Feature                        = 000
    Originating NPA                        = 111
    Originating Number                     = 1111111
    Overseas Indicator                     = 1
    Terminating NPA                        = 00111
    Terminating Number                     = 1112221
    Connect Time \ HH:MM:SS.S\             = 23:03:34.1
    Elapsed Time                           = 000000 min,
                                             00.0 sec
    IC/NC Prefix                           = 00000
    Carrier Connect Date \ YYYY/MM/DD\     = 2002/01/14
    Carrier Connect Time \ HH:MM:SS.S\     = 23:03:34.1
    Carrier Elapsed Time                   = 000000 min,
                                             00.0 sec
    IC/NC Call Event Status                = 000
    Trunk Group Number                     = 00000
    Routing Indicator                      = 0
    Dialing and PreSubscription Indicator  = 4
    ANI/CPN Indicator                      = 2
```

INPUT CDRS:

Description of START:

| Field Name | Max Length | Type |
|---|---|---|
| "START" | 5 | Characters |
| Gateway Name | 27 | Characters |
| Accounting ID | 64 bit | Hexadecimal |
| Start Time in System Ticks | 10 | Decimal |
| Node Time Zone | 26 | Characters |
| Start Time (Date) | 8 | mm/dd/yy |
| Start Time (Time) | 10 | hh:mm:ss.s |
| Time Elapsed from Receipt of Setup Message to Policy Server/Sonus Softswitch Response | 10 | Decimal |
| Time Elapsed from Receipt of Setup Message to Receipt of Alerting/ProcProg | 10 | Decimal |
| Time Elapsed from Receipt of Setup Message to Service Est | 10 | Decimal |
| Service Delivered | 22 | Characters |
| Call Direction (PSTN-TO-IP, etc) | 12 | Characters |
| Service Provider | 23 | Characters |
| Transit Network Selection Code | 4 | Characters |
| Calling Number | 31 | Characters |
| Called Number | 31 | Characters |
| Extra Called Address Digits | 31 | Characters |
| Number of Called Num Translations done by this Node | 1 | Decimal |
| Called Number Before Trans #1 | 31 | Characters |
| Translation Type - 1 | 1 | Decimal |
| Called Number Before Trans #2 | 31 | Characters |
| Translation Type - 2 | 1 | Decimal |
| Billing Number | 31 | Characters |
| Route Table Name | 23 | Characters |
| Route Attempt Number | 1 | Decimal |
| Route Selected | 51 | Characters |
| Local Gateway Signaling IP Address | 15 | Dotted Decimal |
| Remote Gateway Signaling IP Address | 15 | Dotted Decimal |
| Ingress PSTN Trunk Name | 23 | Characters |
| Ingress PSTN Circuit End Point | 39 | Characters |
| Ingress IP Circuit End Point | 37 | Characters |
| Egress PSTN Circuit End Point | 39 | Characters |
| Egress IP Circuit End Point | 37 | Characters |
| Originating Line Information (OLIP) | 2 | Decimal |
| Jurisdiction Information Parameter (JIP) | 15 | Characters |
| Carrier Code | 4 | Characters |
| Call Group ID | 32 bit | Hexidecimal |
| Time Elapsed from Receipt of Setup Message to Receipt of | 10 | Decimal |
| Time Elapsed from Receipt of Setup Message to Generation of | 10 | Decimal |
| Calling Party Nature of Address | 2 | Decimal |
| Called Party Nature of Address | 2 | Decimal |
| Protocol Variant Specific Data #1 | 376* | Characters |
| Ingress Signaling Type | 2 | Decimal |
| Egress Signaling Type | 2 | Decimal |
| Ingress Far End Switch Type | 1 | Decimal |
| Egress Far End Switch Type | 1 | Decimal |
| Carrier Code of the Carrier that owns the Ingress Trunk Group | 4 | Characters |
| Carrier Code of the Carrier that owns the Egress Trunk Group | 4 | Characters |
| Calling Party Category | 8 bit | Hexadecimal |
| Dialed Number | 31 | Characters |
| Carrier Selection Information | 1 | Decimal |
| Called Number Numbering Plan | 1 | Decimal |
| Generic Address Parameter | 31 | Characters |
| Egress Trunk Group Name | 23 | Characters |
| Protocol Variant Specific Data #2 | 376* | Characters |
| Incoming Calling Number | 31 | Characters |
| AMA Call Type | 3 | Characters |
| Message Billing Index (MBI) | 3 | Characters |
| Originating LATA | 3 | Character |
| Route Index Used | 2 | Decimal |
| Calling Party Number Presentation Restriction | 1 | Decimal |
| Incoming ISUP Charge Number | 31 | Characters |
| Incoming ISUP Charge Number NOA | 2 | Decimal |
| Dialed Number NOA | 2 | Decimal |
| GSX Call ID | 32 bit | Hexidecimal |
| Charge Flag | TBD | TBD |

Description of STOP:

| Field Name | Max Length | Type |
|---|---|---|
| "STOP" | 4 | Characters |
| Gateway Name | 27 | Characters |
| Accounting ID | 64 bit | Hexadecimal |
| Start Time in System Ticks | 10 | Decimal |
| Node Time Zone | 26 | Characters |
| Start Time (Date) | 8 | mm/dd/yy |
| Start Time (Time) | 10 | hh:mm:ss.s |

-continued

| Field | Size | Type |
|---|---|---|
| Time Elapsed from Receipt of Setup Message to Policy Server/Sonus Softswitch Response | 10 | Decimal |
| Time Elapsed from Receipt of Setup Message to Receipt of Alerting/ProcProg | 10 | Decimal |
| Time Elapsed from Receipt of Setup Message to Service Est | 10 | Decimal |
| Disconnect Time (Date) | 8 | mm/dd/yy |
| Disconnect Time (Time) | 10 | hh:mm:ss.s |
| Time Elapsed from Receipt of Disconnect to completion of Call | 10 | Decimal |
| Call Service Duration | 10 | Decimal |
| Call Disconnect Reason | 3 | Decimal |
| Service Delivered | 22 | Characters |
| Call Direction (PSTN-TO-IP, etc) | 12 | Characters |
| Service Provider | 23 | Characters |
| Transit Network Selection Code | 4 | Characters |
| Calling Number | 31 | Characters |
| Called Number | 31 | Characters |
| Extra Called Address Digits | 31 | Characters |
| Number of Called Num Translations done by this Node | 1 | Decimal |
| Called Number Before Trans #1 | 31 | Characters |
| Translation Type - 1 | 1 | Decimal |
| Called Number Before Trans #2 | 31 | Characters |
| Translation Type - 2 | 1 | Decimal |
| Billing Number | 31 | Characters |
| Route Table Name | 23 | Characters |
| Route Attempt Number | 1 | Decimal |
| Route Selected | 51 | Characters |
| Local Gateway Signaling IP Address | 15 | Dotted Decimal |
| Remote Gateway Signaling IP Address | 15 | Dotted Decimal |
| Ingress PSTN Trunk Name | 23 | Characters |
| Ingress PSTN Circuit End Point | 39 | Characters |
| Ingress IP Circuit End Point | 37 | Characters |
| Egress PSTN Circuit End Point | 39 | Characters |
| Egress IP Circuit End Point | 37 | Characters |
| Number of Audio Bytes Sent | 9 | Decimal |
| Number of Audio Packets Sent | 9 | Decimal |
| Number of Audio Bytes Rcvd | 9 | Decimal |
| Number of Audio Packets Rcvd | 9 | Decimal |
| Originating Line Information (OLIP) | 2 | Decimal |
| Jurisdiction Information Parameter (JIP) | 15 | Characters |
| Carrier Code | 4 | Characters |
| Call Group ID | 32 bit | Hexidecimal |
| Script Log Data | 96 | Characters |
| Time Elapsed from Receipt of Setup Message to Receipt of | 10 | Decimal |
| Time Elapsed from Receipt of Setup Message to Generation of | 10 | Decimal |
| Calling Party Nature of Address | 2 | Decimal |
| Called Party Nature of Address | 2 | Decimal |
| Protocol Variant Specific Data #1 | 376* | Characters |
| Ingress Signaling Type | 2 | Decimal |
| Egress Signaling Type | 2 | Decimal |
| Ingress Far End Switch Type | 1 | Decimal |
| Egress Far End Switch Type | 1 | Decimal |
| Carrier Code of the Carrier that owns the Ingress Trunk Group | 4 | Characters |
| Carrier Code of the Carrier that owns the Egress Trunk Group | 4 | Characters |
| Calling Party Category | 8 bit | Hexadecimal |
| Dialed Number | 31 | Characters |
| Carrier Selection Information | 1 | Decimal |
| Called Number Numbering Plan | 1 | Decimal |
| Generic Address Parameter | 31 | Characters |
| Disconnect Initiator | 1 | Decimal |
| Number of packets recorded as lost | 10 | Decimal |
| The interarrival packet jitter | 5 | Decimal |
| The last measurement for latency | 5 | Decimal |
| Egress Trunk Group Name | 23 | Characters |
| Protocol Variant Specific Data #2 | 376* | Characters |
| Incoming Calling Number | 31 | Characters |
| AMA Call Type | 3 | Characters |
| Message Billing Index (MBI) | 3 | Characters |
| Originating LATA | 3 | Character |
| Route Index Used | 2 | Decimal |
| Calling Party Number Presentation Restriction | 1 | Decimal |
| Incoming ISUP Charge Number | 31 | Characters |
| Incoming ISUP Charge Number NOA | 2 | Decimal |
| Dialed Number NOA | 2 | Decimal |
| Ingress Codec Type | 5 | String |
| Egress Codec Type | 5 | String |
| RTP Packetization Time | 3 | Decimal |
| GSX Call ID | 32 bit | Hexadecimal |
| Originator Echo Cancellation | 1 | Decimal |
| Terminator Echo Cancellation | 1 | Decimal |
| Charge Flag | TBD | TBD |

Description of SRVINST/SRVEND:

| Field Name | Field Description & Possible Values |
|---|---|
| Identifier | SRVINST/SRVEND |
| Version ID | Version ID of the CDR |
| Data record ID | 0: Single CDR, 1: First Part CDR, 2: Part CDR, 3: Final Part CDR |
| Calling Party VPN-A User Id | Id of the user for the originating end of VPN service |
| Calling Party Number | CLI of the calling party |
| PN of Calling Party - A | PNP of A-Party |
| Dialed number | Destination number |
| Type of Destination | Currently null |
| Called Party PNP number | Destination PNP number |
| Charge Number of Calling party VPN-A | Business Group-Id of destination - A |
| Physical Destination | The routing number |
| Start Date/Time | |
| Month | |
| Date | |
| Time Zone | As an off-set from GMT in millisecs |
| Call Duration | In seconds |
| Type of Calling-Party | Switched On-Net: 0, Dedicated On-Net: 1, Virtual On-Net: 2, Not Known: 3 |
| Type of VPN Call for VPN-A | On Net-On Net:0, On Net-Forced On Net:1, On Net-Virtual On Net:2, On Net-Off Net Local:30, On Net-Off Net National:31, On Net-Off Net International:32, Off Net-On Net Remote Access: 4, Off Net-Off Net Remote Access Local:50, Off Net-Off Net Remote Access National:51, Off Net-Off Net Remote Access International:52 On Net-Forced Virtual On Net:12 Off Net-Forced On Net Remote Access: 41, Off Net-Virtual On Net Remote Access:42, Off Net-Forced Virtual On Net Remote Access:43, Off Net-On Net call:60 Type Not Known:99 |
| Originating SIP Call ID | SIP Call ID for originating call leg |
| Terminating SIP Call ID | SIP Call ID for terminating call leg |
| VPN Cause Code | 403: Call Blocked, 404: No Translation, 503: Failures Related to IVR, 504: Unable to Route, 603: Originating Connection Failed and other SIP Failure Codes |
| Number of IVR interactions | Number of time IVR was used during the call |
| Cost Center of Calling Party VPN-A | VPN cost center ID associated with the calling party at VPN-A |
| Private Call indicator for VPN-A | Indicates whether the call was made using Exit PN at VPN-A. The end user can be billed for this call by the subscriber/enterprise. 0 - Exit PN was not used for this call. 1 - Exit PN used for this call. |
| Call Forwarding | Indicates whether the call was forwarded due to Busy/No-Answer or application of Follow-Me. 0 - Call Forwarding/Follow Me not applied. 1 - Call Forwarding/Follow Me applied. |

| | |
|---|---|
| Initial Called Party Number | The initial called party for whom the call was forwarded or follow me applied. It would hold some value only if Call Forwarding (field 23) is 1. |
| Private Call indicator for VPN-B | Indicates whether the call was made using Exit PN at VPN-B. The end user can be billed for this call by the subscriber/enterprise.<br>0 - Exit PN was not used for this call.<br>1 - Exit PN used for this call. |
| Calling Party VPN-B User Id | This will be the Id of the user by which the user logged in using remote access of VPN-B coming from VPN-A |
| PN of Calling Party-B | This may come into picture as in <4> where user from VPN-A logs into VPN-B using the remote access number of VPN-B and is identified by user and this PNP number. |
| Charge Number of Calling Party VPN-B | Business Group-Id of destination - B |
| Type of VPN Call for VPN-B | <There are types of calls separately for VPN-A and VPN-B, this is required for inter-vpn calls as the there can be s situation when user enters VPN-B from VPN-A either through remote access or through prefix + PN><br>On Net-On Net:0, On Net-Forced On Net:1, On Net-Virtual On Net:2,<br>On Net-Off Net Local:30, On Net-Off Net National:31, On Net-Off Net International:32, Off Net-On Net Remote Access: 4, Off Net-Off Net Remote Access Local:50, Off Net-Off Net Remote Access National:51, Off Net-Off Net Remote Access International:52<br>On Net-Forced Virtual On Net:12<br>Off Net-Forced On Net Remote Access: 41, Off Net-Virtual On Net Remote Access:42,<br>Off Net-Forced Virtual On Net Remote Access:43, Off Net-On Net call:60<br>Type Not Known:99 |
| Cost Center of Calling Party VPN-B | VPN cost center ID associated with the calling party at VPN-B |

Sample Input File:
Originating Leg's START Record:
START,GSX2,0x000100C300001696,32463894,GMT+01:00-Berlin,11/02/2001,12:28:34.9,7,36,1906,VoIP,IP-TO-PSTN,DEFAULT,,9124665031,9124664031,,0,,0,,0,,TO__F91V,1,GSX2:F91
V,10.32.102.40,10.32.102.40, ,
,10.32.102.2:6248/10.32.102.1:6246,1:15:5:30:62:0x00003916:0x0000385F, ,0,,,0x00001696,, ,
,2,2,"SIP,BP__1#926941__32463868@10.32.102.40,
<sip:9124665031@10.32.102.40:5060>;,
sip:9124664031@10.32.102.40:5060",12,1,0,5, ,
,0x0a,9124664031,1,1, ,F91V,
,9124665031,,,440,1,1,,,2,0x000E24DF,
Originating Leg's STOP Record:
STOP,GSX2,0x000100C300001695,32463029,GMT+01:00-Berlin,11/02/2001,12:28:26.3,838,903,2773,11/02/2001,12:30:15.4,10,8148,16,VoIP,PSTN-TO-IP,DEFAULT,,9124665031,102,,0,,0,,0,,TO__VPN,1,VPN__SERVER:SIP,10.
32.102.40,10.32.110.10,F91V,1:15:5:25:57:0x00003916:0x0000385F,
,10.32.102.1:6246/10.32.102.2:6248,801440,5009,800480,5003,0,,,0x00001695,, , ,2,2,"SIP,926941__32463868@10.32.102.40,
<sip:9124665031@10.32.102.40>,
<sip:102@10.32.110.10>",1,12,5,1,,,0x0a,14,1,1, ,2,0,0,0, ,
,9124665031,110,,440,1,1,,,2,C:1:2,P:1:1,20,0x000E24DD,1,,
Terminating Leg's START Record:
START,GSX2,0x000100C300001695,32463029,GMT+01:00-Berlin,11/02/2001,12:28:26.3,838,903,2773,VoIP,PSTN-TO-IP,DEFAULT,,9124665031,102,,0,,0,,0,,TO__VPN,1,VPN__SERVER:SIP,10.
32.102.40,10.32.110.10,F91V,1:15:5:25:57:0x00003916:0x0000385F,
, ,10.32.102.1:6246/10.32.102.2:6248,0,,,0x00001695, ,
,2,2,"SIP,926941__32463868@10.32.102.40,
<sip:9124665031@10.32.102.40>, <sip:102@10.32.110.10>",1,12,5,1,
, ,0x0a,14,1,1, , , ,9124665031,110,,440,1,1,,,2,0x000E24DD,
Terminating Leg's STOP Record:

STOP,GSX2,0x000100C300001696,32463894,GMT+01:00-Berlin,11/02/2001,12:28:34.9,7,36,1906,11/02/2001,12:30:15.3,1,8142,16,VoIP,IP-TO-PSTN,DEFAULT,,9124665031,9124664031,,0,,0,,0,,TO__F91V,1,GSX2:F91
V,10.32.102.40,10.32.102.40, ,
,10.32.102.2:6248/10.32.102.1:6246,1:15:5:30:62:0x00003916:0x0000385F, ,803200,5020,800480,5003,0,,,0x00001696,, ,
,2,2,"SIP,BP__1#926941__32463868@10.32.102.40,
<sip:9124665031@10.32.102.40:5060>;,
sip:9124664031@10.32.102.40:5060",12,1,0,5,,,0x0a,9124664031,1,1, ,2,0,0,0,F91V,
,9124665031,,,440,1,1,,,2,P:1:1,C:1:2,20,0x000E24DF1,,1,
SRVINST:
SRVINST,1,0,91246650311,9124665031,100,102,,102,,144364000,20011102033638,01,10,28800000,0,0,0,926941__32463868@10.32.102.40,BP__1
926941__32463868@10.32.102.40,0,0,1111,0,0,,0,,,,99,***
SRVEND
SRVEND,1,0,91246650311,9124665031,100,102,,102,,144364000,20011102033638,01,10,28800000,81,0,0,
926941__32463868@10.32.102.40,BP__1
926941__32463868@10.32.102.40,0,0,1111,0,0,,0,,,,99,***

URs Generated:
UR# 1:
USAGE RECORD HEADER
BPE Type        : 12
BCI             : -1964922528-K<<H¥ÅêpU--1962169972
FILLED BPIES . . .
CallingPtyNum         = 9124665031
ChargeNum             =
CalledPtyNum          = 102
OriginatingElmtType   = 1
OriginatingElmtId     = GSX1
TerminatingElmtType   = 1
TerminatingElmtId     = GSX1
LocationRoutingNum    = 0
CarrierId             =
OriginatingTrunkType  = 0
OriginatingTrunkId    = 0
OriginatingEndPtName  = 0
RelatedTxnBCI =         -655246805-äˆOˆH,\206¥\215a--2135481868
RoutingNum            = 14
TxnStartTime          = (sec = 1004704106, usec = 3000)
TxnEndTime            = (sec = 1004704215, usec = 4000)
CauseCodeDoc          = 2
TerminationCause      = 16
RecType               = 1
RecStartTime          = (sec = 1004704106, usec = 3000)
RecEndTime            = (sec = 1004704215, usec = 4000)
Terminating FEId      = 0
Direction Indicator   = 1
Service Instance
--------------------------
SERVICE INSTANCE :: [1]
--------------------------
ServStartTime   = (sec = 1004672198, usec = 0)
ServType        = 0
Service BCID    = -655246805-äˆOˆH,\206¥\215a--2135481868
Serv Info Len   = 185
---------------------------------------------
Orignating Sonus Info Length = 535
Record Id = 0
UR# 2:
USAGE RECORD HEADER
BPE Type        : 12
BCI             : -655246805-äîˆ OˆH,\206¥\215a--2135481868
FILLED BPIES . . .
CallingPtyNum         = 9124665031
ChargeNum             =
CalledPtyNum          = 9124664031
OriginatingElmtType   = 1
OriginatingElmtId     = GSX2
TerminatingElmtType   = 1
TerminatingElmtId     = GSX2
LocationRoutingNum    = 0
CarrierId             =

-continued

```
OriginatingTrunkType    = 0
OriginatingTrunkId      = 0
OriginatingEndPtName    = 0
RelatedTxnBCI           = -1964922528-K<<HÅêpU--1962169972
RoutingNum              = 9124664031
TxnStartTime            = (sec = 1004704114, usec = 9000)
TxnEndTime              = (sec = 1004704215, usec = 3000)
CauseCodeDoc            = 2
TerminationCause        = 16
RecType                 = 1
RecStartTime            = (sec = 1004704114, usec = 9000)
RecEndTime              = (sec = 1004704215, usec = 3000)
Originating FEId        = 0
Direction Indicator     = 2
Service Instance
--------------------------
SERVICE INSTANCE :: [1]
--------------------------
ServStartTime           = (sec = 1004672198, usec = 0)
ServType                = 0
Service BCID            = -1964922528-K<<H¥ÅêpU--1962169972
Serv Info Len           = 185
--------------------------------------------
Terminating Sonus Info Length = 560
Record Id = 0
CDR Generated:
Version Identifier      = 4
Record Identifier       = 1
Origination Trunk Number = F91V
Origination Area Code   = 0xEEEE
Destination Number      = 0x00144364000
Destination Trunk Number = SIP
Begin Date              = 01/11/02 12:28:54
Time Before Hook Up(sec) = 27
Call Duration (sec)     = 81
Filler                  = 0
Successful Call Indicator = 1
TMR                     = 3
Service Type            = 34
Cause Value             = 16
Location                = 255
First Bitset of NP.UKK  = 0
Origin Customer Identifier = 00
out of NP.UKK
```

Although the above has been described in terms of specific system hardware and software features, it would be recognized that there could be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. One of ordinary skill in the art would recognize many variations, modifications, and alternatives.

The system is merely provided to show an example of a way of implementing the present invention. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A fault tolerant system for monitoring information real-time through a network, the system comprising:
   a plurality of network elements, each of the network elements being coupled together in a network, each of the network elements comprising an interface device, the plurality of network elements being configured to route a call from a source to a destination through the network elements;
   a plurality of mediator processes coupled to each of the network elements, the plurality of mediator processes number from 1 to N, where N is an integer greater than 1, each of the mediator processes being-configured to receive events from any one of the network elements as associated with the call as the call is being routed through the elements from the source to the destination; and
   a distributor process coupled to each of the mediator processes, the distributor being configured to distribute incoming events for any one of the mediator processes that experiences a fault to the other 1 through N mediator processes excluding the mediator processes that has experienced a fault.

2. The system of claim 1 further comprising a correlation process coupled between the messaging bus and the mediator, the correlation process comprising a plurality of rules, each of the rules being-configured to change information received from the mediator to one of a plurality of call detail records, each of the call detail records being of a preselected format.

3. The system of claim 1 wherein the plurality of network elements comprise at least a router and one or more devices selected from a switch, a server, a Media Gateway, Softswitch, and an Integrated Access Device.

4. The system of claim 1 wherein the source is a caller location and wherein the destination is a receiver location.

5. The system of claim 1 wherein the plurality of mediator processes are respectively provided on a plurality of server devices, number from 1 through M, where M is equal to N.

6. The system of claim 1 wherein the distributor process selects one of the mediator processes for the incoming events associated with a single call.

7. The system of claim 1 further comprising a network interface coupled to the distributor process, the network interface being-configured to convert incoming events into a common protocol for use in any one of the mediator processes.

8. The system of claim 1 wherein the distributor process is provided in an adaptor.

* * * * *